US012587041B2

(12) United States Patent
Jiang

(10) Patent No.: US 12,587,041 B2
(45) Date of Patent: Mar. 24, 2026

(54) WIRELESS CHARGING METHOD AND APPARATUS, COMMUNICATION APPARATUS, AND COMPUTER READABLE STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 136 days.

(21) Appl. No.: 18/683,380

(22) PCT Filed: Aug. 17, 2021

(86) PCT No.: PCT/CN2021/113114
§ 371 (c)(1),
(2) Date: Feb. 13, 2024

(87) PCT Pub. No.: WO2023/019449
PCT Pub. Date: Feb. 23, 2023

(65) Prior Publication Data
US 2024/0348106 A1       Oct. 17, 2024

(51) Int. Cl.
*H02J 50/80*         (2016.01)
(52) U.S. Cl.
CPC .................................... *H02J 50/80* (2016.02)
(58) Field of Classification Search
CPC ...................................................... H02J 50/80
USPC ........................................................ 307/104
See application file for complete search history.

(56) References Cited

U.S. PATENT DOCUMENTS

| | | | |
|---|---|---|---|
| 9,985,465 B1 * | 5/2018 | Glover .................... | H02J 50/20 |
| 2009/0191879 A1 * | 7/2009 | Ichikawa .......... | H04W 36/0085 |
| | | | 455/442 |
| 2011/0096739 A1 * | 4/2011 | Heidari ............... | H04W 72/542 |
| | | | 370/329 |
| 2011/0149941 A1 * | 6/2011 | Gong .................... | H04L 5/0023 |
| | | | 370/480 |
| 2016/0126749 A1 * | 5/2016 | Shichino ................ | H02J 50/60 |
| | | | 307/104 |

(Continued)

FOREIGN PATENT DOCUMENTS

| | | |
|---|---|---|
| CN | 103380643 A | 10/2013 |
| CN | 103384952 A | 11/2013 |

(Continued)

OTHER PUBLICATIONS

ISA State Intellectual Property Office of the People's Republic of China, International Search Report Issued in Application No. PCT/CN2021/113114, May 17, 2022, WIPO, 5 pages.

(Continued)

*Primary Examiner* — Alfonso Perez Borroto
(74) *Attorney, Agent, or Firm* — Volpe Koenig

(57)           ABSTRACT

The present invention relates to a wireless charging method, comprising: sending a wireless charging request to a network device for requesting the network device to provide a wireless charging configuration for the terminal, wherein the wireless charging request carries first auxiliary information, and the first auxiliary information at least indicates a wireless charging configuration expected by the terminal for assisting the network device to determine the wireless charging configuration.

17 Claims, 6 Drawing Sheets

Send a wireless charging request to a network device for requesting the network device to provide a wireless charging configuration for the terminal; wherein the wireless charging request carries first auxiliary information; the first auxiliary information at least indicates a wireless charging configuration expected by the terminal for assisting the network device to determine the wireless charging configuration

S101

(56)                References Cited

U.S. PATENT DOCUMENTS

| | | | | |
|---|---|---|---|---|
| 2016/0126753 | A1* | 5/2016 | Wight ..................... | H02J 50/90 |
| | | | | 307/104 |
| 2017/0250561 | A1 | 8/2017 | Li et al. | |
| 2017/0373544 | A1* | 12/2017 | Niizuma ................. | B60L 50/60 |
| 2018/0191191 | A1 | 7/2018 | Kaushik et al. | |
| 2021/0013750 | A1* | 1/2021 | Kronander .............. | H02J 50/80 |
| 2021/0160842 | A1* | 5/2021 | Bai ...................... | H04B 7/0413 |

FOREIGN PATENT DOCUMENTS

| | | | |
|---|---|---|---|
| CN | 111615839 | A | 9/2020 |
| CN | 113054691 | A | 6/2021 |
| CN | 113841317 | A | 12/2021 |
| JP | 2013219475 | A | 10/2013 |
| WO | 2017/183815 | A1 | 10/2017 |

OTHER PUBLICATIONS

State Intellectual Property Office of the People's Republic of China, Office Action and Search Report Issued in Application No. 2021800022920, Apr. 25, 2024, 20 pages.
ISA State Intellectual Property Office of the People's Republic of China, Written Opinion of the International Searching Authority Issued in Application No. PCT/CN2021/113114, May 17, 2022, WIPO, 8 pages.

* cited by examiner

Send a wireless charging request to a network device for requesting the network device to provide a wireless charging configuration for the terminal; wherein the wireless charging request carries first auxiliary information; the first auxiliary information at least indicates a wireless charging configuration expected by the terminal for assisting the network device to determine the wireless charging configuration — S101

FIG. 1

Receive broadcast information from the network device, and send the wireless charging request to the network device if it is determined according to the broadcast information that the network device supports wireless charging — S201

FIG. 2

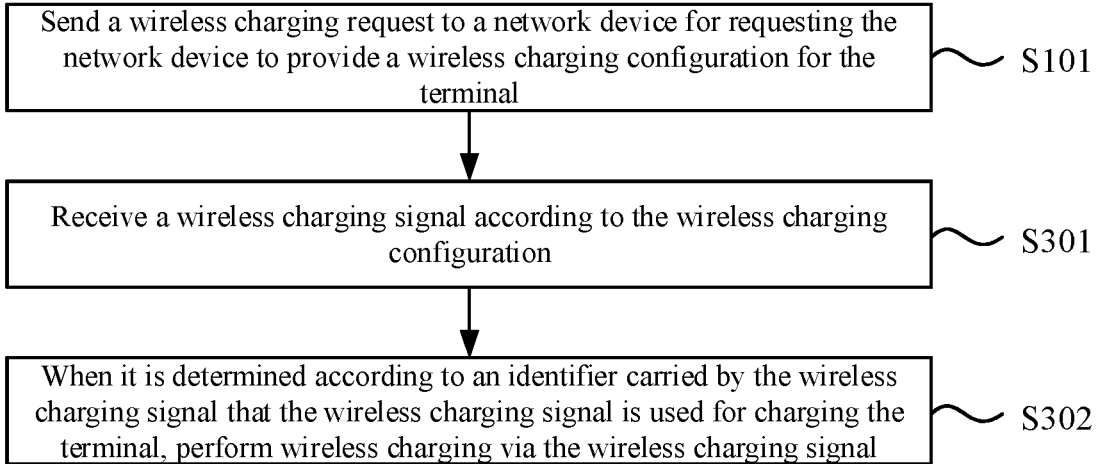

FIG. 3

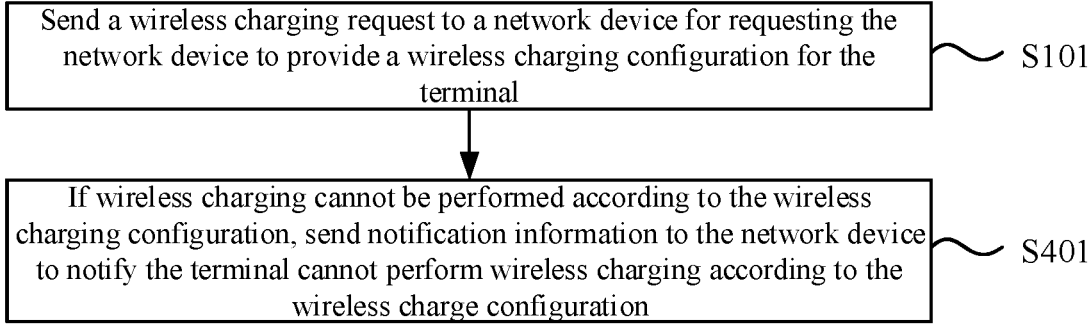

FIG. 4

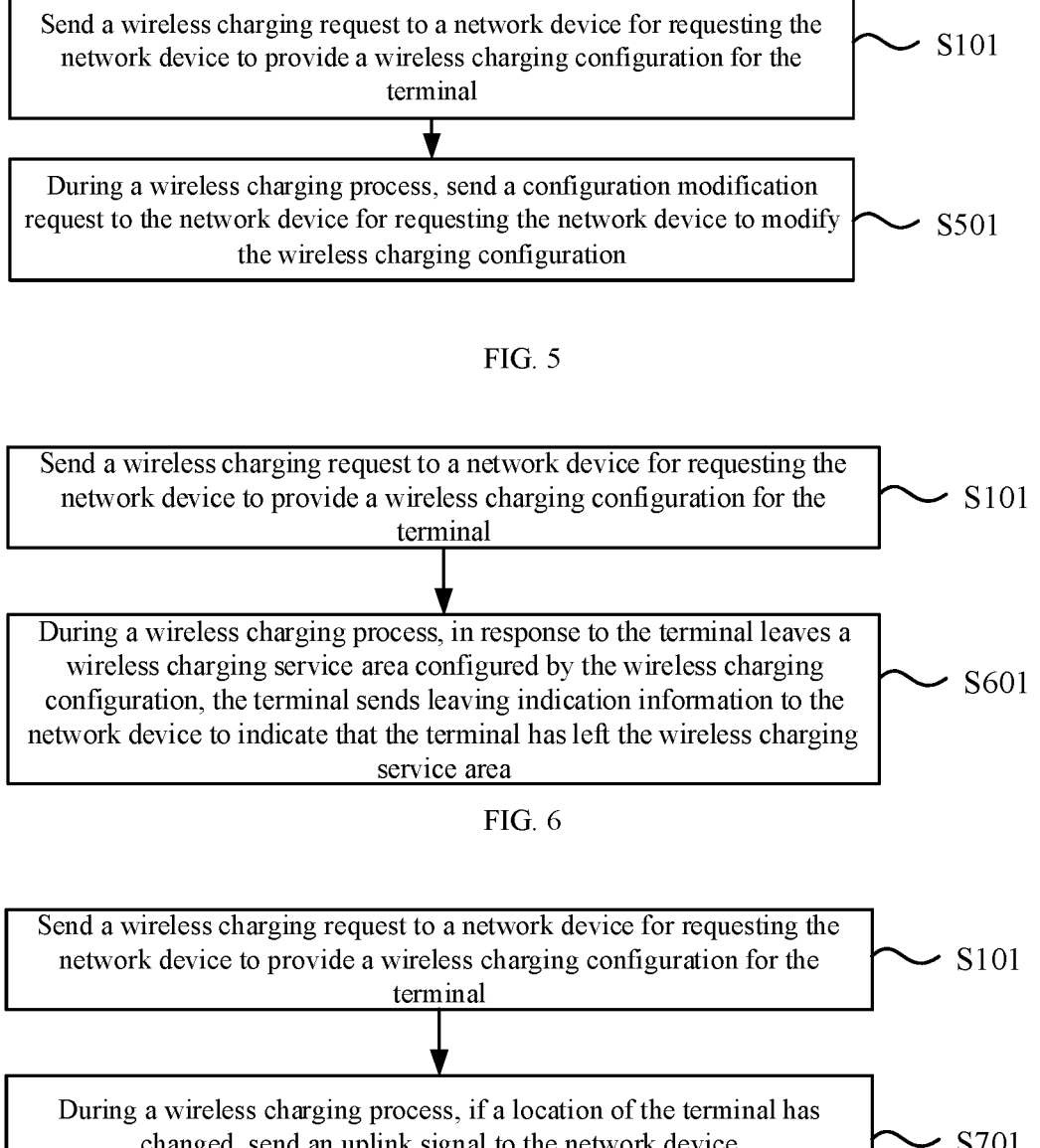

Send a wireless charging request to a network device for requesting the network device to provide a wireless charging configuration for the terminal    S101

During a wireless charging process, send a configuration modification request to the network device for requesting the network device to modify the wireless charging configuration    S501

FIG. 5

Send a wireless charging request to a network device for requesting the network device to provide a wireless charging configuration for the terminal    S101

During a wireless charging process, in response to the terminal leaves a wireless charging service area configured by the wireless charging configuration, the terminal sends leaving indication information to the network device to indicate that the terminal has left the wireless charging service area    S601

FIG. 6

Send a wireless charging request to a network device for requesting the network device to provide a wireless charging configuration for the terminal    S101

During a wireless charging process, if a location of the terminal has changed, send an uplink signal to the network device    S701

FIG. 7

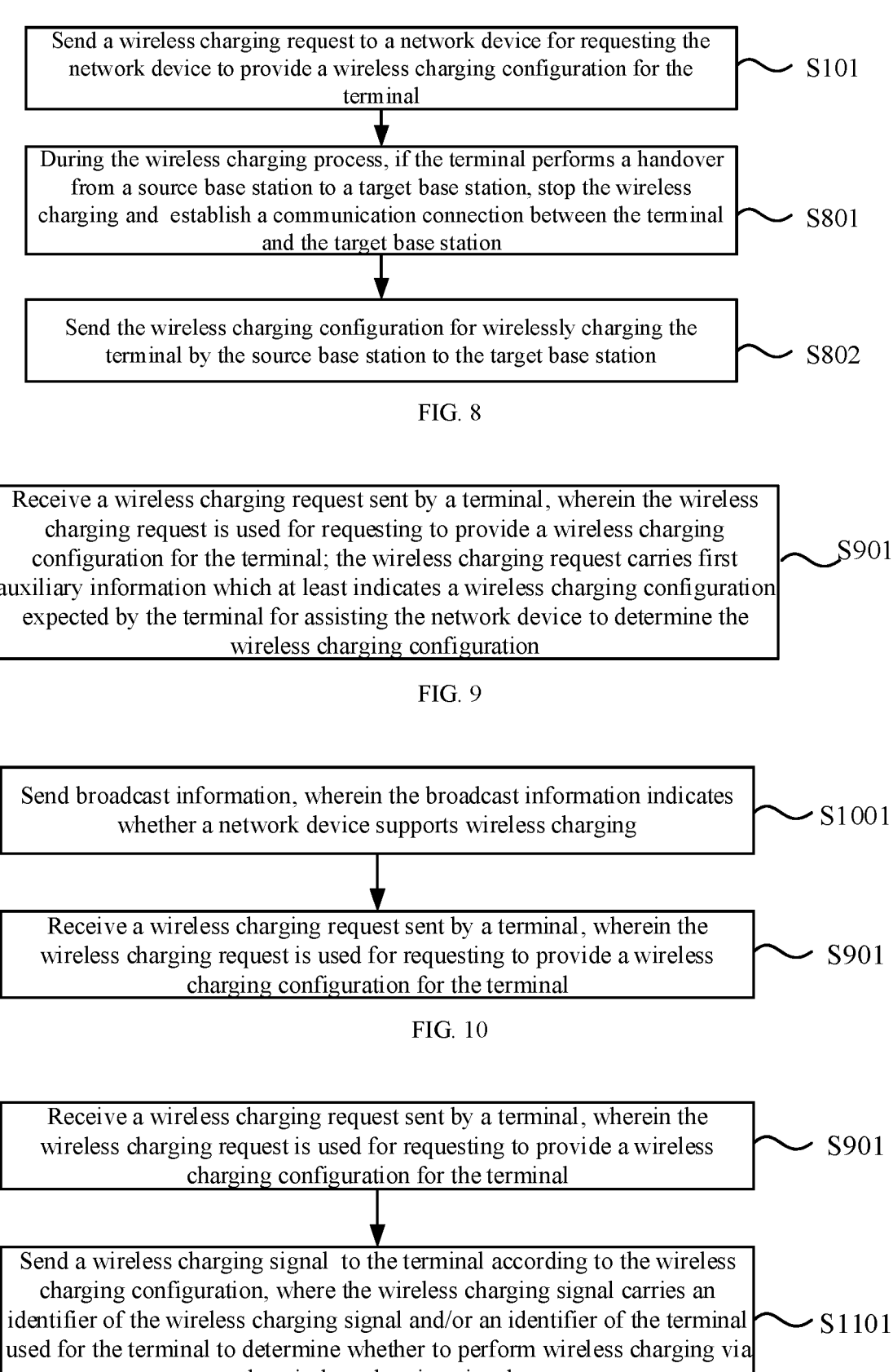

Send a wireless charging request to a network device for requesting the network device to provide a wireless charging configuration for the terminal ~ S101

During the wireless charging process, if the terminal performs a handover from a source base station to a target base station, stop the wireless charging and establish a communication connection between the terminal and the target base station ~ S801

Send the wireless charging configuration for wirelessly charging the terminal by the source base station to the target base station ~ S802

FIG. 8

Receive a wireless charging request sent by a terminal, wherein the wireless charging request is used for requesting to provide a wireless charging configuration for the terminal; the wireless charging request carries first auxiliary information which at least indicates a wireless charging configuration expected by the terminal for assisting the network device to determine the wireless charging configuration ~ S901

FIG. 9

Send broadcast information, wherein the broadcast information indicates whether a network device supports wireless charging ~ S1001

Receive a wireless charging request sent by a terminal, wherein the wireless charging request is used for requesting to provide a wireless charging configuration for the terminal ~ S901

FIG. 10

Receive a wireless charging request sent by a terminal, wherein the wireless charging request is used for requesting to provide a wireless charging configuration for the terminal ~ S901

Send a wireless charging signal to the terminal according to the wireless charging configuration, where the wireless charging signal carries an identifier of the wireless charging signal and/or an identifier of the terminal used for the terminal to determine whether to perform wireless charging via the wireless charging signal ~ S1101

FIG. 11

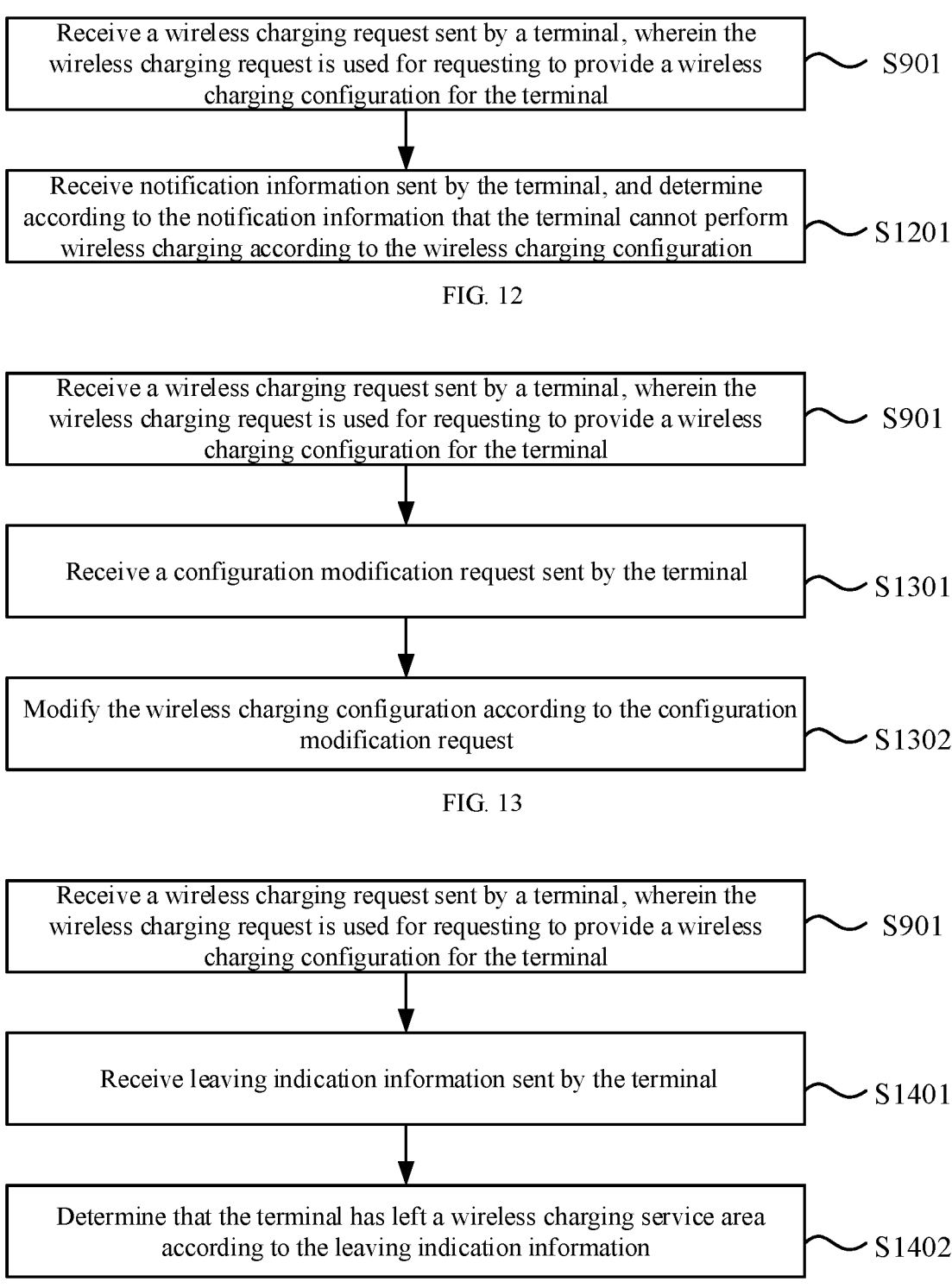

Receive a wireless charging request sent by a terminal, wherein the wireless charging request is used for requesting to provide a wireless charging configuration for the terminal          S901

Receive notification information sent by the terminal, and determine according to the notification information that the terminal cannot perform wireless charging according to the wireless charging configuration          S1201

FIG. 12

Receive a wireless charging request sent by a terminal, wherein the wireless charging request is used for requesting to provide a wireless charging configuration for the terminal          S901

Receive a configuration modification request sent by the terminal          S1301

Modify the wireless charging configuration according to the configuration modification request          S1302

FIG. 13

Receive a wireless charging request sent by a terminal, wherein the wireless charging request is used for requesting to provide a wireless charging configuration for the terminal          S901

Receive leaving indication information sent by the terminal          S1401

Determine that the terminal has left a wireless charging service area according to the leaving indication information          S1402

FIG. 14

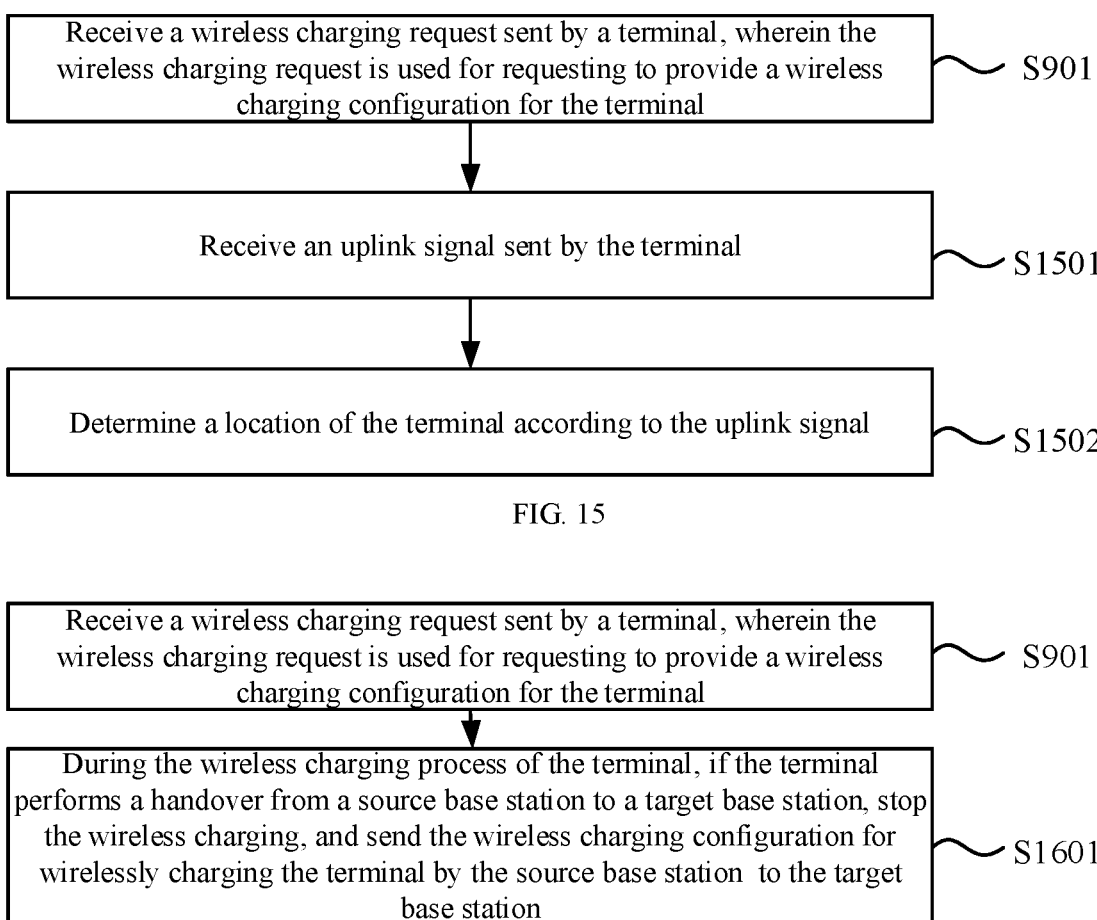

| Receive a wireless charging request sent by a terminal, wherein the wireless charging request is used for requesting to provide a wireless charging configuration for the terminal | S901 |

| Receive an uplink signal sent by the terminal | S1501 |

| Determine a location of the terminal according to the uplink signal | S1502 |

FIG. 15

| Receive a wireless charging request sent by a terminal, wherein the wireless charging request is used for requesting to provide a wireless charging configuration for the terminal | S901 |

| During the wireless charging process of the terminal, if the terminal performs a handover from a source base station to a target base station, stop the wireless charging, and send the wireless charging configuration for wirelessly charging the terminal by the source base station to the target base station | S1601 |

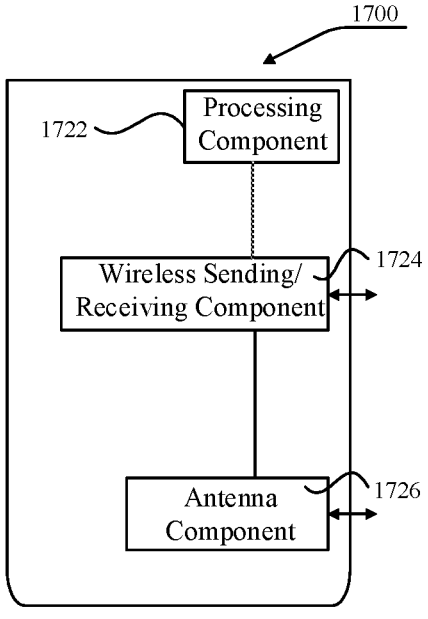

1722 — Processing Component

Wireless Sending/ Receiving Component — 1724

Antenna Component — 1726

FIG. 17

WIRELESS CHARGING METHOD AND APPARATUS, COMMUNICATION APPARATUS, AND COMPUTER READABLE STORAGE MEDIUM

CROSS REFERENCE TO RELATED APPLICATIONS

This application is a National Stage of International Application No. PCT/CN2021/113114, filed on Aug. 17, 2021, the disclosure of which is incorporated herein by reference in its entirety for all purposes.

TECHNICAL FIELD

The present disclosure relates to the field of communication technology, and in particular, to a wireless charging method, a wireless charging apparatus, a communication apparatus, and a computer-readable storage medium.

BACKGROUND

With the development of cellular mobile communication technology, especially the development of millimeter-wave communication technology, a base station can be configured with more and more antennas. Based on a large number of antennas, some base stations can also provide wireless charging services for terminals. However, the charging efficiency of the current wireless charging technology is low, and the time required for a terminal to be fully charged is too long.

SUMMARY

In view of the above, embodiments of the present disclosure propose a wireless charging method, a wireless charging apparatus, a communication apparatus, and a computer-readable storage medium to solve the technical problems in the related art.

According to a first aspect of the embodiments of the present disclosure, a wireless charging method is provided, which is performed by a terminal, and the method comprises: sending to a network device a wireless charging request for requesting the network device to provide a wireless charging configuration for the terminal; wherein the wireless charging request carries first auxiliary information, and the first auxiliary information at least indicates a wireless charging configuration expected by the terminal for assisting the network device to determine the wireless charging configuration.

According to a second aspect of the embodiments of the present disclosure, a wireless charging method is provided, which is performed by a network device, and the method comprises: receiving a wireless charging request sent by a terminal, wherein the wireless charging request is used for requesting to provide a wireless charging configuration for the terminal, and the wireless charging request carries first auxiliary information which at least indicates a wireless charging configuration expected by the terminal for assisting the network device to determine the wireless charging configuration.

According to a third aspect of embodiments of the present disclosure, a wireless charging apparatus is provided, which comprises one or more processors configured to send to a network device a wireless charging request for requesting the network device to provide a wireless charging configuration for a terminal; wherein the wireless charging request carries first auxiliary information, and the first auxiliary information at least indicates a wireless charging configuration expected by the terminal for assisting the network device to determine the wireless charging configuration.

According to a fourth aspect of embodiments of the present disclosure, a communication apparatus is provided, which comprises: a processor; a storage for storing processor-executable instructions; wherein the processor is configured to execute the wireless charging method applicable to a base station.

According to a fifth aspect of embodiments of the present disclosure, there is provided a computer readable storage medium for storing a computer program, where the computer program, when executed by a processor, implements the steps of the wireless charging method applicable to a terminal.

BRIEF DESCRIPTION OF DRAWINGS

In order to illustrate the technical solutions in the embodiments of the present disclosure more clearly, the attached drawings to be used in the description of the embodiments will be briefly introduced below, and obviously, the drawings in the following description are only some embodiments of the present disclosure, and those skilled in the art may further obtain other drawings according to these drawings without creative labor.

FIG. 1 is a schematic flow chart illustrating a wireless charging method according to an embodiment of the present disclosure;

FIG. 2 is a schematic flowchart illustrating another wireless charging method according to an embodiment of the present disclosure;

FIG. 3 is a schematic flowchart illustrating yet another wireless charging method according to an embodiment of the present disclosure;

FIG. 4 is a schematic flowchart illustrating yet another wireless charging method according to an embodiment of the present disclosure;

FIG. 5 is a schematic flowchart illustrating yet another wireless charging method according to an embodiment of the present disclosure;

FIG. 6 is a schematic flowchart illustrating yet another wireless charging method according to an embodiment of the present disclosure;

FIG. 7 is a schematic flowchart illustrating yet another wireless charging method according to an embodiment of the present disclosure;

FIG. 8 is a schematic flowchart illustrating yet another wireless charging method according to an embodiment of the present disclosure;

FIG. 9 is a schematic flow chart illustrating a wireless charging method according to an embodiment of the present disclosure;

FIG. 10 is a schematic flowchart illustrating another wireless charging method according to an embodiment of the present disclosure;

FIG. 11 is a schematic flowchart illustrating yet another wireless charging method according to an embodiment of the present disclosure;

FIG. 12 is a schematic flowchart illustrating yet another wireless charging method according to an embodiment of the present disclosure;

FIG. 13 is a schematic flowchart illustrating yet another wireless charging method according to an embodiment of the present disclosure;

FIG. 14 is a schematic flowchart illustrating yet another wireless charging method according to an embodiment of the present disclosure;

FIG. 15 is a schematic flowchart illustrating yet another wireless charging method according to an embodiment of the present disclosure;

FIG. 16 is a schematic flowchart illustrating yet another wireless charging method according to an embodiment of the present disclosure;

FIG. 17 is a schematic block diagram illustrating a wireless charging apparatus according to an embodiment of the present disclosure;

DETAILED DESCRIPTION

Figure 18:
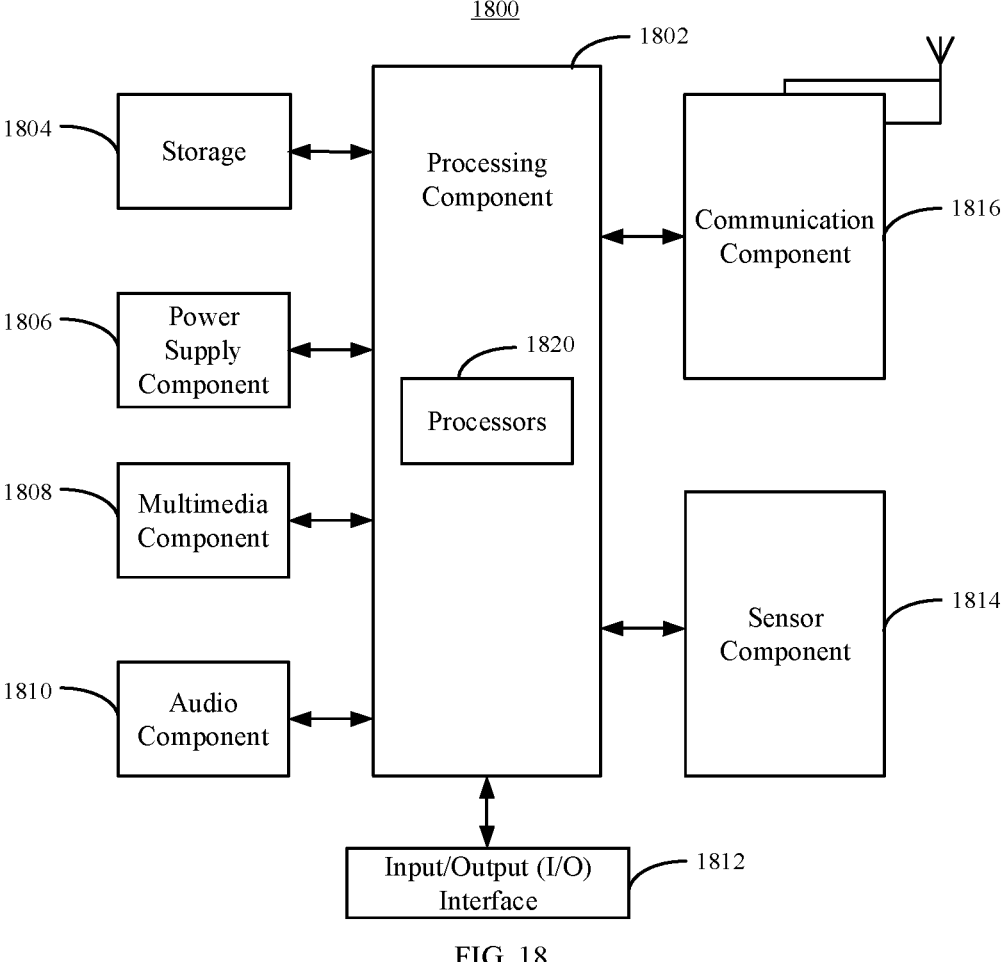
FIG. 18 is a schematic block diagram illustrating a wireless charging apparatus according to an embodiment of the present disclosure.

In the following, the technical solutions in the embodiments of the present disclosure will be clearly and completely described with reference to the attached drawings in the embodiments of the present disclosure. Obviously, the described embodiments are only a part of the embodiments, but not all of the embodiments of the present disclosure. Based on the embodiments of the present disclosure, all other embodiments obtained by those of ordinary skill in the art without creative work fall within the scope of the present disclosure.

Terms used in the embodiments of the present disclosure are for the purpose of describing particular examples only, and are not intended to limit the present disclosure. Terms determined by "a", "the" and "said" in their singular forms in the embodiments of the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the embodiments of the present disclosure to describe various information, such information should not be limited to these terms. These terms are only used to distinguish one category of information from another. For example, without departing from the scope of the embodiments of the present disclosure, first information may be referred as second information; and similarly, the second information may also be referred as the first information. Depending on the context, the term "if" as used herein may be interpreted as "when" or "upon" or "in response to determining".

For purposes of brevity and ease of understanding, the terms "greater than" or "less than", "higher than" or "lower than" are used herein when characterizing a magnitude relationship. However, for those skilled in the art, it can be understood that the term "greater than" also covers the meaning of "greater than or equal to", and the term "less than" also covers the meaning of "less than or equal to"; and the term "higher than" covers the meaning of "higher than and equal to", and the term "lower than" also covers the meaning of "lower than and equal to.

FIG. 1 is a schematic flow chart illustrating a wireless charging method according to an embodiment of the present disclosure. The wireless charging method shown in the embodiment may be performed by a terminal, and the terminal includes but is not limited to a mobile phone, a tablet computer, a wearable device, a sensor, an Internet of Things device, and other communication devices. The terminal may serve as a user equipment to communicate with a network device, and the network device includes but is not limited to a network device in a communication system such as 4G, 5G, and 6G, for example, a base station, a core network, and the like.

The wireless charging involved in all embodiments of the present disclosure includes the wireless charging of a terminal by a base station, wherein the mode of the wireless charging includes at least one of: an electromagnetic induction mode, an electromagnetic resonance mode, or a radio frequency mode.

In an embodiment, a terminal may be charged via the radio frequency mode, and in particular, the terminal may be charged in the air.

Charging in the air means that a base station can transmit, to the terminal, energy in the form of millimeter waves and narrow bandwidth through multiple antennas. The terminal may receive the energy through micro-beacon antennas, and then convert it into electric energy to perform charging. The base station has the capability of charging in the air, which can further mean that the base station is able to determine a location of the terminal, and then transmit energy to the terminal in the location for charging.

As shown in FIG. 1, the wireless charging method may include step S101.

In step S101, a wireless charging request is sent to a network device for requesting the network device to provide a wireless charging configuration for the terminal. Wherein the wireless charging request carries first auxiliary information. The first auxiliary information at least indicates a wireless charging configuration expected by the terminal and is configured to assist the network device to determine the wireless charging configuration.

In an embodiment, the terminal may send a wireless charging request to the network device for requesting the network device to provide a wireless charging configuration for the terminal, wherein the terminal may send the wireless charging request to the network device as needed, for example, sending the wireless charging request to the network device if a current electric quantity of the terminal is lower than a threshold. Certainly, a trigger condition for sending the wireless charging request to the network device is not limited to the condition that the current electric quantity of the terminal is lower than a threshold, and may be set specifically as needed.

In an embodiment, after the network device receives a wireless charging request from the terminal, if the network device determines to agree to wirelessly charge the terminal, the network device may determine to send a wireless charging configuration to the terminal, and the terminal may receive the wireless charging configuration. Then, the terminal may subsequently perform charging according to the wireless charging configuration. After the network device receives the wireless charging request, if the network device determines not to agree to wirelessly charging the terminal, it may send a refusal indication to the terminal to indicate that the network device refuses to wirelessly charge the terminal.

For example, the network device may determine the identity of the terminal, and then determine whether the terminal has signed up for a wireless charging service according to the identity of the terminal. The network device agrees to wirelessly charge the terminal only if the terminal has signed the wireless charging service. Otherwise, the network device does not agree to wirelessly charge the terminal. For example, the network device may determine a distance between the terminal and a base station (for example, a base station corresponding to a cell in which the terminal is currently located), and agree to wirelessly charge the terminal only if the distance is less than a distance threshold. Otherwise, the network device does not agree to wirelessly charge the terminal.

The wireless charging configuration comprises at least one of: time domain resources of wireless charging, frequency domain resources of wireless charging, an identifier of a wireless charging signal, an identifier of a wireless charging beam, a wireless charging speed, or wireless charging service area information.

The terminal may receive the wireless charging signal at the time domain resources of wireless charging indicated by the wireless charging configuration. The terminal may determine whether the wireless charging signal in the wireless charging beam is used for charging itself according to the identifier of the wireless charging signal and the identifier of the wireless charging beam. If so, the terminal performs wireless charging via the wireless charging signal in the wireless charging beam. Otherwise, the terminal does not perform wireless charging via the wireless charging signal in the wireless charging beam. The terminal may perform wireless charging at the wireless charging speed according to the wireless charging configuration of the terminal. For example, the terminal may perform wireless charging at a power corresponding to the wireless charging speed. The terminal may receive the wireless charging signal to perform wireless charging if the terminal is in an area corresponding to the wireless charging service area information.

In an embodiment, the network device includes, but is not limited to, a base station and a core network. For example, the network device includes a base station, and the terminal may send a wireless charging request to the base station by carrying it in a Radio Resource Control (RRC) layer signaling. The base station may further send the wireless charging configuration to the terminal through RRC signaling; for example, the network device includes a core network. The terminal may send a wireless charging request to the core network by carrying it in a non-access stratum (NAS) message, and the core network may further send the wireless charging configuration to the terminal through a NAS message. In addition to these modes, the terminal may also carry the wireless charging request in user plane data and send it to the network device, and the network device may also send the wireless charging configuration to the terminal during a user plane data communication process.

According to embodiments of the present disclosure, a wireless charging request sent by a terminal to a base station may carry first auxiliary information, which indicates to and informs the network device of a wireless charging configuration expected by the terminal, thereby assisting the network device in providing the wireless charging configuration for the terminal. This way enables the network device to provide for the terminal the wireless charging configuration which matches the wireless charging configuration expected by the terminal as much as possible, facilitates the terminal to receive a wireless charging signal according to the wireless charging configuration expected by the terminal, which is conducive to improving charging efficiency, and shortening charging time.

For example, after determining the wireless charging configuration expected by the terminal according to the first auxiliary information, the network device may judge whether the wireless charging configuration expected by the terminal is available. If it is available, for example, the load of the wireless charging configuration expected by the terminal is low, or, for example, the wireless charging configuration expected by the terminal is low, or, for example, the wireless charging configuration expected by the terminal has not been configured for other devices, the wireless charging configuration expected by the terminal may be preferentially selected as the wireless charging configuration configured for the terminal. If it is not available, for example, the load of the wireless charging configuration expected by the terminal is high, or, for example, the wireless charging configuration expected by the terminal has been configured for other devices, then the network device may determine the wireless charging configuration for the terminal as needed.

In an embodiment, the first auxiliary information comprises at least one of: a remaining electric quantity of the terminal, an expected charging speed, speed information of the terminal, location information of the terminal or quality information of a downlink signal received by the terminal.

In an embodiment, the terminal may determine its expected wireless charging configuration, such as an expected charging speed. The speed may be related to power. For example, based on power, the speed can be divided into: a fast speed, a medium speed and a low speed.

In addition to the expected wireless charging configuration, the first auxiliary information may also carry state information of the terminal itself, such as the remaining battery quantity of the terminal, the speed information of the terminal (the terminal may be moving, and the speed information includes a speed magnitude and a speed direction), and the location information of the terminal, etc. So that the core network may determine the wireless charging configuration suitable for the current condition of the terminal according to the state information of the terminal and provide the wireless charging configuration for the terminal.

For example, take a beam as a charging signal, the network device may determine, according to the location information of the terminal, that the network device charges the terminal through a beam A that can aim at the terminal. Then the network device may carry the information of the beam A (such as a direction, power, time-frequency resources, etc.) in the wireless charging configuration information and send it to the terminal. The terminal may determine the direction of the beam A according to the wireless charging configuration information, and then receive the beam A to perform charging.

In addition, the first auxiliary information may further carry a situation of a signal received by the terminal, for example, the signal quality of the downlink signal received by the terminal. The signal quality may be determined according to Reference Signal Receiving Power (RSRP), Reference Signal Receiving Quality (RSRQ), and the like. The network device may determine whether the quality of the downlink signal received by the terminal is good enough according to the signal quality. Since the wireless charging signal is also a downlink signal, if the network device determines that the signal quality is relatively low, the network device may send a wireless charging signal with relatively high power to the terminal, so as to ensure a faster charging speed.

The wireless charging configuration may be determined by comprehensively considering each item of the first auxiliary information rather than considering a certain item alone. In addition, the first auxiliary information is only used to assist the network device in determining the wireless charging configuration. The network device may choose to determine the wireless charging configuration based on the first auxiliary information, or may choose not to determine the wireless charging configuration based on the first auxiliary information.

In an embodiment, although a network device may include a core network and a base station, both of which may provide a wireless charging configuration for a terminal, it is generally the base station that sends the wireless charging signal to the terminal, and the wireless charging signal may be sent in a form of a beam. For example, the core network may instruct multiple base stations to cooperatively charge the terminal, or it may instruct a base station to charge the terminal, or it may instruct one or more Transmission and Reception Points (TRPs) on the base station to charge the terminal.

All of the subsequent embodiments may be implemented in the case that the wireless charging request is only used to request the network device to provide a wireless charging configuration for the terminal without carrying the first auxiliary information, and may also be implemented in the case that the wireless charging request is used to request the network device to provide a wireless charging configuration for the terminal while carrying the first auxiliary information, which may be selected as needed.

FIG. 2 is a schematic flowchart illustrating another wireless charging method according to an embodiment of the present disclosure. As shown in FIG. 2, sending the wireless charging request to the network device comprises the step S201.

In step S201, broadcast information from the network device is received, and the wireless charging request is sent to the network device if it is determined according to the broadcast information that the network device supports wireless charging.

In an embodiment, the network device may broadcast information according to its own capability, such as broadcasting a system message, and the broadcast information may carry capability information about whether the network device supports wireless charging. The terminal sends a wireless charging request to the network device only when determining, according to the broadcast information, that the network device supports wireless charging, and does not need to send a wireless charging request to the network device when determining that the network device does not support wireless charging, so as to avoid wasting uplink resources.

In an embodiment, sending the wireless charging request to the network device comprises: sending the wireless charging request to the network device if at least one of the following conditions is satisfied: a distance from the base station is less than a first distance threshold; a Timing Advance (TA) is less than a preset value; or a signal quality of the downlink signal is higher than a first quality threshold.

In an embodiment, the terminal may further determine whether to send a wireless charging request to the network device according to the relationship between the terminal itself and the network device. For example, the wireless charging request is sent to the network device only if the distance between the terminal and the base station is relatively small, such as less than the first distance threshold, otherwise, the wireless charging request is not sent to the network device, so as to avoid an undesirable wireless charging effect and a waste of wireless resources. For example, only when the TA is relatively small, such as less than a preset value, the wireless charging request is sent to the network device, otherwise the wireless charging request is not sent to the network device, so as to avoid an undesirable wireless charging effect and a waste of wireless resources. For example, only when the signal quality of the downlink signal is relatively high, such as higher than the first quality threshold, the wireless charging request is sent to the network device, otherwise, the wireless charging request is not sent to the network device, so as to avoid an undesirable wireless charging effect and a waste of wireless resources.

FIG. 3 is a schematic flowchart illustrating yet another wireless charging method according to an embodiment of the present disclosure. As shown in FIG. 3, the method includes the previously described step S101 and further comprises steps S301 and S302.

In step S301, a wireless charging signal is received according to the wireless charging configuration.

In step S302, when it is determined according to an identifier carried by the wireless charging signal that the wireless charging signal is used for charging the terminal, wireless charging is performed via the wireless charging signal.

In an embodiment, the network device may carry a wireless charging signal in a beam and send it to the terminal. In the wireless charging signal, an identifier may be carried.

For example, a terminal identifier may be carried in the wireless charging signal to indicate that the wireless charging signal is used for communicating with a terminal corresponding to the identifier. After the terminal receives the wireless charging signal, if the terminal determines that the terminal identifier carried in the wireless charging signal is the same as its own identifier, the terminal may perform wireless charging via the wireless charging signal. Otherwise, the terminal does not perform wireless charging via the wireless charging signal.

For example, the identifier of the beam and/or the identifier of the wireless charging signal may be carried in the wireless charging signal. The terminal may determine, according to the wireless charging configuration information, the identifier of the beam and the identifier of the wireless charging signal configured by the network device for charging the terminal. And then, after receiving the wireless charging signal, the terminal may judge whether the identifier of the wireless charging signal and the identifier of the beam carried in the wireless charging signal are the same as those configured in the wireless charging configuration information. If so, wireless charging can be performed via the wireless charging signal. Otherwise, wireless charging is not performed via the wireless charging signal.

In an embodiment, the method further comprises: stopping wireless charging in response to receiving a wireless charging stop indication sent by the network device.

The network device may determine when to stop the wireless charging of the terminal as needed. For example, the network device may send a wireless charging stop indication to the terminal during the charging process to instruct the terminal to stop the wireless charging, and the terminal may stop receiving the wireless charging signal so as to avoid wasting its own resources.

In an embodiment, the method further comprises: sending a stop request to the network device for requesting the network device to stop wirelessly charging the terminal; and stopping wireless charging according to feedback information sent by the network device corresponding to the stop request.

The terminal may determine when to stop wireless charging according to its own needs. For example, the terminal may send a stop request to the network device during a charging process to request the network device to stop wirelessly charging the terminal. The network device may send feedback information to the terminal after receiving the stop request, and the terminal may stop receiving the wireless charging signal and stop wireless charging after receiving the feedback information. Accordingly, it can be prevented from continuing to send the wireless charging signal to waste resources of the network device when the terminal stops receiving the wireless charging signal.

FIG. 4 is a schematic flowchart illustrating yet another wireless charging method according to an embodiment of the present disclosure. As shown in FIG. 4, the method includes previously described S101 and further comprises step S401.

In step S401, if wireless charging cannot be performed according to the wireless charging configuration, notification information is sent to the network device to notify the terminal that it cannot perform wireless charging according to the wireless charging configuration.

In an embodiment, as a wireless charging process is affected by various factors, such as the environment, it may result in the terminal not being able to perform wireless charging according to the wireless charging configuration sent to the terminal from the network device. For example, when the terminal fails to receive a charging signal and/or the charging speed is inconsistent with that configured in the wireless charging configuration, the terminal may send notification information to the network device to notify the network device that the terminal cannot perform wireless charging according to the wireless charging configuration, so that the network device may modify the wireless charging configuration, thereby wirelessly charging the terminal well.

In an embodiment, the notification information further carries a reason why the terminal cannot perform the wireless charging according to the wireless charging configuration.

The terminal may further carry the reason why the terminal cannot perform the wireless charging according to the wireless charging configuration in the notification information, for example, the location of the terminal has changed, a current location of the terminal, a wireless charging speed of the terminal, etc., so that the network device can accurately determine why the terminal cannot perform wireless charging according to the current wireless charging configuration, thereby accurately making an adjustment. For example, a beam direction of the wireless charging signal may be adjusted according to the current location of the terminal. For example, when the wireless charging speed of the terminal is low, the power of the wireless charging signal may be increased. Thus, the terminal can be wirelessly charged well.

FIG. 5 is a schematic flowchart illustrating yet another wireless charging method according to an embodiment of the present disclosure. As shown in FIG. 5, the method includes previously described S101 and further comprises step S501.

In step S501, during a wireless charging process, a configuration modification request is sent to the network device to request that the network device modify the wireless charging configuration.

In an embodiment, during the wireless charging process, the terminal may determine whether the wireless charging configuration needs to be modified according to the actual situation. If so, the terminal may send a configuration modification request to the network device to request that the network device modify the wireless charging configuration. For example, in the case where the location of the terminal is changed, the wireless charging speed is relatively low, etc., the terminal may send a configuration modification request to the network device to request the network device to modify the wireless charging configuration, thereby adjusting the direction of the wireless charging signal and increasing the power of the wireless charging signal.

In an embodiment, the configuration modification request carries second auxiliary information for assisting the network device to modify the wireless charging configuration, wherein the second auxiliary information at least indicates a modified wireless charging configuration expected by the terminal.

The terminal may carry second auxiliary information in the configuration modification request, where the second auxiliary information mainly indicates the modified wireless charging configuration expected by the terminal, such as a modified charging speed expected by the terminal. Thus, the network device modifies the wireless charging configuration to be consistent with that expected by the terminal.

In addition, the second auxiliary information may further indicate a current condition of the terminal, such as current electric quantity of the terminal, a current charging speed and quality information of a downlink signal currently received by the terminal, etc. Thus, the network device may modify the wireless charging configuration according to the current condition of the terminal, so that the modified wireless charging configuration is more suitable for wirelessly charging the terminal in the current condition.

In an embodiment, the method further comprises: during the wireless charging process, periodically sending to the network device at least one of the following charging related information: a wireless charging speed, an intensity of a wireless charging signal, a charged electric quantity, a current electric quantity, location information of the terminal, or a proportion of normal charging time, etc.

During the wireless charging process, the terminal may periodically report charging related information, such as a wireless charging speed, an intensity of a wireless charging signal, a charged electric quantity, a current electric quantity, location information of the terminal, and a proportion of normal charging time, etc., to the network device, so that the network device can grasp the current charging condition of the terminal in time. In the case where the charging condition of the terminal is not ideal, the wireless charging configuration may be appropriately modified according to the charging condition of the terminal, so as to adapt to wireless charging of the terminal in the current condition.

The location information of the terminal may be Global Positioning System (GPS) information, or may be an area identifier of an area to which the current location of the terminal belongs. The location information may be reported in a trigger period, or may be reported when a moving distance of the terminal (for example, a moving distance calculated from the time the wireless resource configuration information is received) is greater than a distance threshold. The specific reporting conditions are not limited to these two, and may be configured by the network device as needed. The terminal may determine a length of time for which the wireless charging speed and/or the wireless charging power meet a threshold value during wireless charging, and calculate the ratio of the length of time to the overall length of time of wireless charging as a proportion of normal charging time.

Information such as a threshold value or a threshold in all embodiments of the present disclosure may be configured for the terminal by the network device, or may be determined through negotiation between the network device and the terminal.

FIG. 6 is a schematic flowchart illustrating yet another wireless charging method according to an embodiment of the present disclosure. As shown in FIG. 6, the method includes previously described S101 and further comprises step S601.

In step S601, during a wireless charging process, in response to the terminal leaving a wireless charging service area configured by the wireless charging configuration, the terminal sends leaving indication information to the network device to indicate that the terminal has left the wireless charging service area.

In an embodiment, the network device may, in the wireless charging configuration, designate one or more wireless charging service areas for the terminal. The network device sends a wireless charging signal to the wireless charging service area, and the terminal may receive the wireless charging signal in the wireless charging service area to perform wireless charging.

However, the location of the terminal changes with the movements of a user. If the terminal leaves the wireless charging service area, it will result in the terminal not being able to receive the wireless charging signal, and thereby not being able to perform wireless charging. Therefore, during the wireless charging process of the terminal, if the terminal leaves the wireless charging service area configured by the wireless charging configuration, the terminal may send leaving indication information to the network device to inform the network device that the terminal has left the wireless charging service area and cannot perform wireless charging. Thus, the network device may, under the condition that the terminal still needs to be wirelessly charged, modify the wireless charging configuration and reconfigure a wireless charging service area according to the location of the terminal to continue to wirelessly charge the terminal.

In an embodiment, the method further comprises: the leaving indication information further indicating whether the terminal expects to continue wireless charging after the terminal has left the wireless charging service area, and carrying location information of the terminal if the terminal expects to continue the wireless charging.

Since there are various reasons for the terminal to leave the wireless charging service area, it is possible that the terminal leaves the wireless charging service area in order to stop wireless charging, or it is possible that the terminal leaves the wireless charging area with an inadvertent movement of a user while the terminal still expects to continue wireless charging.

Therefore, the terminal may indicate, through the leaving indication information, whether the terminal expects to continue the wireless charging after leaving the wireless charging service area. If the terminal expects to continue the wireless charging, the leaving indication information may further carry the location information of the terminal to be sent to the network device. Thus, the network device may modify the wireless charging configuration, for example, adjusting the beam direction of the wireless charging signal to make it suitable for communicating with the terminal after the terminal leaves the wireless charging service area.

In an embodiment, the terminal is in a connected state or an unconnected state, and the method further comprises sending expectation indication information to the network device to indicate whether the terminal expects to continue wireless charging after entering the unconnected state.

In an embodiment, the terminal receives the wireless charging signal sent by the network device to perform wireless charging, wherein the wireless charging signal may be received in a connected state or in an unconnected state (including an idle state and an inactive state) of the terminal.

Since in the connected state, there is a communication connection, such as an Radio Resource Control (RRC) connection, between the terminal and the base station, the base station may request the terminal to report real-time location information through the communication connection, so that the base station may modify the beam direction of the wireless charging signal in the wireless charging configuration according to the real-time location information of the terminal to ensure efficient wireless charging of the terminal.

However, in the unconnected state, there is no communication connection between the terminal and the base station, so it is difficult for the base station to acquire the location information of the terminal in real time. In this case, the base station may designate a wireless charging service area for the terminal in the wireless charging configuration information, and send a wireless charging signal to the wireless charging service area. When the terminal moves to the wireless charging service area, it can receive the wireless charging signal for wireless charging. In this way, the wireless charging of the terminal may be implemented even under the condition that the base station does not know the real-time location of the terminal.

Therefore, when the terminal enters the unconnected state from the connected state, the terminal may send the expectation indication information to the network device to indicate whether the terminal still expects to continue the wireless charging after entering the unconnected state. Thus, the network device may modify the wireless charging configuration information for the terminal in the unconnected state, so as to make it suitable for wireless charging of the terminal in the unconnected state.

In an embodiment, the terminal expects to continue wireless charging after entering the unconnected state, and the method further comprises: receiving unconnected-state wireless charging configuration information sent by the network device, determining an unconnected-state wireless charging service area according to the unconnected-state wireless charging configuration information; and after entering the unconnected state, receiving a wireless charging signal to perform wireless charging while being in the unconnected-state wireless charging service area.

In an embodiment, if the terminal expects to continue the wireless charging after entering the unconnected state, the network device may send the unconnected-state wireless charging configuration information to the terminal. Where the unconnected-state wireless charging configuration information may carry an unconnected-state wireless charging service area, so that the terminal receives the wireless charging signal to perform wireless charging when the terminal is located in the connection-state wireless charging service area after the terminal enters the unconnected state.

If there is already a wireless charging service area in the wireless charging configuration information that has been sent to the terminal, it can be selected to carry a new wireless charging service area as an unconnected-state wireless charging service area, in the unconnected-state wireless charging configuration information. Also, it can be selected not to carry an unconnected-state wireless charging service area, and the terminal may default to the wireless charging service area already existing in the received wireless charging configuration information, as the unconnected-state wireless charging service area. If there is no wireless charging service area configured in the wireless charging configuration information that has been sent to the terminal, it may be necessary to carry a new wireless charging service area as the unconnected-state wireless charging service area, in the unconnected-state wireless charging configuration information.

In the connected state, the base station may further designate a wireless charging service area for the terminal in the wireless charging configuration information. In this case, the terminal may not modify the beam direction of the wireless charging signal with the movement of the terminal, and only needs to send the wireless charging signal to the wireless charging service area.

FIG. 7 is a schematic flowchart illustrating yet another wireless charging method according to an embodiment of the present disclosure. As shown in FIG. 7, the method includes previously described S101 and further comprises step S701.

In step S701, during a wireless charging process, if a location of the terminal has changed, an uplink signal is sent to the network device.

In an embodiment, if the location of the terminal has changed during the wireless charging process, the terminal may send an uplink signal to the network device, and the network device may locate the terminal according to the received uplink signal to determine the location of the terminal, so that the network device may modify the wireless charging configuration according to the location of the terminal, for example, adjusting the beam direction of a wireless charging signal, so as to wirelessly charge the terminal well.

The uplink signal may be, for example, a preamble, a measurement report, a Sounding Reference Signal (SRS), or the like.

In an embodiment, sending the uplink signal to the network device if the location of the terminal has changed comprises: if a location of the terminal has changed, sending the uplink signal to the network device in response to a trigger condition being satisfied. Wherein the trigger condition comprises at least one of: a moving distance with respect to a starting location where the wireless charging signal is received is greater than a second distance threshold; or a signal quality of the wireless charging signal is lower than a second quality threshold.

If the location of the terminal has changed during the wireless charging process, the terminal may judge whether a trigger condition for sending an uplink signal is satisfied. For example, when the moving distance relative to the starting location where the wireless charging signal is received is greater than a second distance threshold, sending of the uplink signal may be triggered. In this case, the moving distance of the terminal is large, and an uplink signal may be sent to the network device for re-determining the location of the terminal. For example, if the signal quality of the wireless charging signal (for example, the signal quality during a period of time) is lower than the second quality threshold, sending of an uplink signal may be triggered. In this case, the effect of receiving the wireless charging signal by the terminal is poor and the charging speed is low, which may be caused by a change in the location of the terminal, and an uplink signal may be sent to the network device for re-determining the location of the terminal.

In an embodiment, the method further comprises: sending wireless charging capability information of the terminal to the network device; and receiving capability support information sent by the network device according to the wireless charging capability information, wherein the capability support information indicates that the network device supports the wireless charging capability of the terminal. Wherein, after receiving the capability support information, send the wireless charging request to the network device.

In an embodiment, the terminal may send its own wireless charging capability information to the network device, for example, a wireless charging power, a wireless charging frequency, and a maximum electric quantity supported by the terminal, and the network device may determine the support for the wireless charging capability of the terminal. If the network device is capable of supporting the wireless charging capability of the terminal, for example, the network device can send a wireless charging signal at the wireless charging frequency supported by the terminal, and can send the wireless charging signal according to the wireless charging power supported by the terminal. The network device may send the capability support information to the terminal. After receiving the capability support information, the terminal may determine that the network device can support wireless charging of the terminal according to the wireless charging capability of the terminal, and then send a wireless charging request to the network device.

FIG. 8 is a schematic flowchart illustrating yet another wireless charging method according to an embodiment of the present disclosure. As shown in FIG. 8, the method includes previously described S101 and further comprises the steps S801 and S802.

In step S801, during the wireless charging process, if the terminal performs a handover from a source base station to a target base station, the wireless charging is stopped and a communication connection between the terminal and the target base station is established.

In step S802, the wireless charging configuration for wirelessly charging the terminal by the source base station is sent to the target base station.

In an embodiment, during a wireless charging process of the terminal, a cell handover may also occur. For example, the base station corresponding to the original cell is the source base station, and the base station corresponding to the target cell to which the terminal performs a handover is the target base station. Therefore, the terminal may stop wireless charging and perform a cell handover process. When the terminal is switched to the target cell and establishes a communication connection with the target base station, the terminal may send the wireless charging configuration for wirelessly charging the terminal by the source base station to the target base station. Thus, the target base station may continue to wirelessly charge the terminal according to the received wireless charging configuration.

Further, the terminal may also inform the target base station of an identifier of the source base station. The target base station may send an indication to the source base station after establishing a communication connection with the terminal, so as to instruct the source base station to stop wirelessly charging the terminal and release the wireless charging configuration for the terminal.

FIG. 9 is a schematic flow chart illustrating a wireless charging method according to an embodiment of the present disclosure. The wireless charging method shown in the embodiment may be executed by a network device. The network device includes but is not limited to a network device in a communication system such as 4G, 5G, and 6G, for example, a base station and a core network. The terminal includes but is not limited to a communication device such as a mobile phone, a tablet computer, a wearable device, a sensor, and an Internet of Things device. The terminal may be used as user equipment for communicating with the network device.

As shown in FIG. 9, the wireless charging method may include step S901.

In step S901, a wireless charging request sent by a terminal is received, wherein the wireless charging request is used for requesting to provide a wireless charging configuration for the terminal. The wireless charging request carries first auxiliary information, which at least indicates a wireless charging configuration expected by the terminal, for assisting the network device to determine the wireless charging configuration.

In an embodiment, the terminal may send a wireless charging request to the network device for requesting the network device to provide a wireless charging configuration for the terminal, wherein the terminal may send the wireless charging request to the network device as needed, for example, sending the wireless charging request to the network device when the current electric quantity is lower than a threshold. The trigger condition for sending the wireless charging request to the network device is not limited to the current electric quantity of the terminal, and may be specifically set as needed.

In an embodiment, after a network device receives a wireless charging request from a terminal, if the network device determines to agree to wirelessly charge the terminal, the network device may determine to send a wireless charging configuration to the terminal, and the terminal may receive the wireless charging configuration. Then, the terminal may subsequently perform charging according to the wireless charging configuration. After the network device receives the wireless charging request, if the network device determines not to agree to wirelessly charging the terminal, it may send a refusal indication to the terminal to indicate that the network device refuses to wirelessly charge the terminal.

For example, the network device may determine the identity of the terminal, and then determine whether the terminal has signed up for a wireless charging service according to the identity of the terminal. The network device agrees to wirelessly charge the terminal if the terminal has signed the wireless charging service. Otherwise, the network device does not agree to wirelessly charge the terminal. For example, the network device may determine a distance between the terminal and a base station (for example, the base station corresponding to the cell in which the terminal is currently located), and agree to wirelessly charge the terminal if the distance is less than a distance threshold. Otherwise, the network device does not agree to wirelessly charge the terminal.

The wireless charging configuration comprises at least one of: time domain resources of wireless charging, frequency domain resources of wireless charging, an identifier of a wireless charging signal, an identifier of a wireless charging beam, a wireless charging speed, or wireless charging service area information.

The terminal may receive a wireless charging signal at the time domain resources of wireless charging indicated by the wireless charging configuration. The terminal may determine whether the wireless charging signal in the wireless charging beam is used for charging itself according to an identifier of the wireless charging signal and the identifier of the wireless charging beam. If so, the terminal performs wireless charging via the wireless charging signal in the wireless charging beam. Otherwise, the terminal does not perform wireless charging via the wireless charging signal in the wireless charging beam. The terminal may be charged at the wireless charging speed according to the wireless charging configuration of the terminal. For example, the terminal may be charged at the power corresponding to the wireless charging speed. The terminal may receive the wireless charging signal to perform wireless charging if the terminal is in an area corresponding to the wireless charging service area information.

In an embodiment, the network device includes, but is not limited to, a base station and a core network. For example, the network device includes a base station, and the terminal may send a wireless charging request to the base station by carrying it in a Radio Resource Control (RRC) signaling, and the base station may further send the wireless charging configuration to the terminal through an RRC signaling; for example, the network device includes a core network. The terminal may send a wireless charging request to the core network by carrying it in a non-access stratum (NAS) message, and the core network may further send the wireless charging configuration to the terminal through a NAS message. In addition to these modes, the terminal may also carry the wireless charging request in user plane data and send it to the network device, and the network device may also send the wireless charging configuration to the terminal during a user plane data communication process.

According to embodiments of the present disclosure, a wireless charging request sent by a terminal to a base station may carry first auxiliary information, which indicates to and informs a network device of a wireless charging configuration expected by the terminal, thereby assisting the network device in providing the wireless charging configuration for the terminal. This way enables the network device to provide for the terminal the wireless charging configuration that matches the wireless charging configuration expected by the terminal as much as possible, facilitating the terminal to receive a wireless charging signal according to the wireless charging configuration expected by the terminal, which is conducive to improving charging efficiency, and shortening charging time.

For example, after determining the wireless charging configuration expected by the terminal according to the first auxiliary information, the network device may judge whether the wireless charging configuration expected by the terminal is available. If it is available, for example, the load of the wireless charging configuration expected by the terminal is low, or, for example, the wireless charging configuration expected by the terminal has not been configured for other devices, the wireless charging configuration expected by the terminal may be preferentially selected as the wireless charging configuration configured for the terminal. If it is not available, for example, the load of the wireless charging configuration expected by the terminal is high, or, for example, the wireless charging configuration expected by the terminal has been configured for other devices, then the network device may determine the wireless charging configuration for the terminal as needed.

In an embodiment, the first auxiliary information comprises at least one of: remaining electric quantity of the terminal, an expected charging speed, speed information of the terminal, location information of the terminal or quality information of a downlink signal received by the terminal.

In an embodiment, the terminal may determine its expected wireless charging configuration, such as an expected charging speed. The speed may be related to power. For example, based on power, the speed can be divided into: a fast speed, a medium speed and a low speed.

In addition to the expected wireless charging configuration, the first auxiliary information may also carry state information of the terminal itself, such as the remaining battery quantity of the terminal, the speed information of the terminal (including a speed magnitude and a speed direction), and the location information of the terminal, etc. So that the core network may determine the wireless charging configuration suitable for the current condition of the terminal according to the state information of the terminal and provide the wireless charging configuration for the terminal.

For example, take a beam as a charging signal, the network device may determine, according to the location information of the terminal, that the network device charges the terminal through a beam A that can aim at the terminal. Then the network device may carry the information of the beam A (such as a direction, power, time-frequency resources, etc.) in the wireless charging configuration information and send it to the terminal. The terminal may determine the direction of the beam A according to the wireless charging configuration information, and then receive the beam A to perform charging.

In addition, the first auxiliary information may further carry a situation of a signal received by the terminal, for example, the signal quality of the downlink signal received by the terminal. The signal quality may be determined according to Reference Signal Receiving Power (RSRP), Reference Signal Receiving Quality (RSRQ), and the like. The network device may determine whether the quality of the downlink signal received by the terminal is good enough according to the signal quality. Since the wireless charging signal is also a downlink signal, if the network device determines that the signal quality is relatively low, the network device may send a wireless charging signal with relatively high power to the terminal, so as to ensure a faster charging speed.

The wireless charging configuration may be determined by comprehensively considering each item of the first auxiliary information rather than considering a certain item alone. In addition, the first auxiliary information is only used to assist the network device to determine the wireless charging configuration. The network device may choose to determine the wireless charging configuration based on the first auxiliary information, or may choose not to determine the wireless charging configuration based on the first auxiliary information.

In an embodiment, although a network device may include a core network and a base station, both of which may provide a wireless charging configuration for a terminal, it is generally the base station that sends the wireless charging signal to the terminal, and the wireless charging signal may be sent in a form of a beam.

All of the subsequent embodiments may be implemented in the case that the wireless charging request is only used to request the network device to provide a wireless charging configuration for the terminal without carrying the first auxiliary information, and may also be implemented in the case that the wireless charging request is used to request the network device to provide a wireless charging configuration for the terminal while carrying the first auxiliary information, which may be selected as needed.

FIG. 10 is a schematic flowchart illustrating another wireless charging method according to an embodiment of the present disclosure. As shown in FIG. 10, the method includes previously described S901 and further comprises step S1001.

In step S1001, broadcast information is sent, wherein broadcast information indicates whether a network device supports wireless charging.

In an embodiment, the network device may send broadcast information according to its own capability, such as broadcasting a system message, and the broadcast information may carry capability information about whether the network device supports wireless charging. The terminal sends a wireless charging request to the network device only when determining, according to the broadcast information, that the network device supports wireless charging, and does not need to send a wireless charging request to the network device when determining that the network device does not support wireless charging, so as to avoid wasting uplink resources.

In an embodiment, the method further comprises sending a wireless charging signal to the terminal according to the wireless charging configuration, wherein a width of a beam corresponding to the wireless charging signal is less than a width of a beam used when the network device communicates with the terminal, and/or a power of a beam corresponding to the wireless charging signal is greater than a power of the beam used when the network device communicates with the terminal.

Since the wireless charging signal transmitted when wirelessly charging the terminal is used for increasing the electric quantity of the terminal, and the speed of increasing the electric quantity is related to the power and the accuracy of the beam direction. Therefore, compared with a width of a beam used for communication, the width of the beam corresponding to the wireless charging signal may be relatively small, so that more power can be concentrated in a smaller range to transmit to the terminal, thereby centrally charging the terminal; similarly, comparing with the power of the signal used for communication, the power of the wireless charging signal may be relatively large in order to ensure the charging speed of the terminal.

FIG. 11 is a schematic flowchart illustrating yet another wireless charging method according to an embodiment of the present disclosure. As shown in FIG. 11, the method includes previously described S901 and further comprises step S1101.

In step S1101, a wireless charging signal is sent to the terminal according to the wireless charging configuration, where the wireless charging signal carries an identifier of the wireless charging signal and/or an identifier of the terminal used for the terminal to determine whether to perform wireless charging via the wireless charging signal.

In an embodiment, the network device may carry a wireless charging signal in a beam and send it to the terminal. In the wireless charging signal, an identifier may be carried.

For example, a terminal identifier may be carried in the wireless charging signal to indicate that the wireless charging signal is used for communication with a terminal corresponding to the identifier. After the terminal receives the wireless charging signal, if the terminal determines that the terminal identifier carried in the wireless charging signal is the same as its own identifier, the terminal may perform wireless charging via the wireless charging signal. Otherwise, the terminal does not perform wireless charging via the wireless charging signal.

For example, the identifier of the beam and/or the identifier of the wireless charging signal may be carried in the wireless charging signal. Based on the wireless charging configuration information, the terminal may determine the identifier of the beam and the identifier of the wireless charging signal configured by the network device for charging the terminal. And then, after receiving the wireless charging signal, the terminal may judge whether the identifier of the wireless charging signal and the identifier of the beam carried in the wireless charging signal are the same as those configured in the wireless charging configuration information. If so, wireless charging can be performed via the wireless charging signal. Otherwise, wireless charging is not performed via the wireless charging signal.

In an embodiment, the method further comprises sending a wireless charging stop indication to the terminal to instruct the terminal to stop wireless charging.

The network device may determine when to stop wireless charging of the terminal as needed. For example, the network device may send a wireless charging stop indication to the terminal during the charging process to instruct the terminal to stop the wireless charging, and the terminal may stop receiving the wireless charging signal so as to avoid wasting its own resources.

In an embodiment, the method further comprises: receiving a stop request sent by the terminal; sending, according to the stop request, feedback information to the terminal to instruct the terminal to stop wireless charging.

The terminal may determine when to stop wireless charging according to its own needs. For example, the terminal may send a stop request to the network device during a charging process to request the network device to stop wirelessly charging the terminal. The network device may send feedback information to the terminal after receiving the stop request, and the terminal may stop receiving the wireless charging signal and stop wireless charging after receiving the feedback information. Accordingly, the network device can be prevented from continuing to send the wireless charging signal when the terminal stops receiving the wireless charging signal, thereby avoiding wasting resources of the network device.

FIG. 12 is a schematic flowchart illustrating yet another wireless charging method according to an embodiment of the present disclosure. As shown in FIG. 12, the method includes previously described S901 and further comprises step S1201.

In step S1201, notification information sent by the terminal is received, and it is determined according to the notification information that the terminal cannot perform wireless charging according to the wireless charging configuration.

In an embodiment, as a wireless charging process is affected by various factors such as environment, it may result in the terminal not being able to perform wireless charging according to the wireless charging configuration sent to the terminal from the network device. For example, if the terminal fails to receive a charging signal and the charging speed is inconsistent with that configured in the wireless charging configuration, etc., the terminal may send notification information to the network device to notify the network device that the terminal cannot perform wireless charging according to the wireless charging configuration, so that the network device may modify the wireless charging configuration, thereby wirelessly charging the terminal well.

In an embodiment, the method further comprises: according to the notification information, determining a reason why the terminal cannot perform wireless charging according to the wireless charging configuration.

The terminal may further carry in the notification information the reason why the terminal cannot perform the wireless charging according to the wireless charging configuration, for example, a changed location of the terminal, a current location of the terminal, a wireless charging speed of the terminal, etc., so that the network device can accurately determine why the terminal cannot perform wireless charging according to the wireless charging configuration, thereby accurately making an modification. For example, a beam direction of the wireless charging signal may be adjusted according to the current location of the terminal. For example, when the wireless charging speed of the terminal is low, the power of the wireless charging signal may be increased. In this way, the terminal can be wirelessly charged well.

FIG. 13 is a schematic flowchart illustrating yet another wireless charging method according to an embodiment of the present disclosure. As shown in FIG. 13, the method includes previously described S901 and further comprises the steps S1301 and S1302.

In step S1301, a configuration modification request sent by the terminal is received.

In step S1302, the wireless charging configuration is modified according to the configuration modification request.

In an embodiment, during the wireless charging process, the terminal may determine whether the wireless charging configuration needs to be modified according to the actual situation. If so, the terminal may send a configuration modification request to the network device to request the network device to modify the wireless charging configuration. For example, in the case where the location of the terminal is changed, the wireless charging speed is relatively low, etc., the terminal may send a configuration modification request to the network device to request the network device to modify the wireless charging configuration, thereby adjusting the direction of the wireless charging signal and increasing the power of the wireless charging signal.

In an embodiment, the method further comprises: according to second auxiliary information carried in the configuration modification request, modifying the wireless charging configuration, wherein the second auxiliary information at least indicates a modified wireless charging configuration expected by the terminal.

The terminal may carry second auxiliary information in the configuration modification request, where the second auxiliary information mainly indicates the modified wireless charging configuration expected by the terminal, such as a modified charging speed expected by the terminal, so that the network device modifies the wireless charging configuration to be consistent with that expected by the terminal.

In addition, the second auxiliary information may further indicate a current condition of the terminal, such as a current electric quantity of the terminal, a current charging speed and quality information of a downlink signal currently received by the terminal, etc., so that the network device may modify the wireless charging configuration according to the current condition of the terminal. Thus, the modified wireless charging configuration is more suitable for wireless charging of the terminal in the current condition.

In an embodiment, the method further comprises: periodically receiving at least one of following charging related information sent by the terminal: a wireless charging speed, an intensity of a wireless charging signal, a charged electric quantity, a current electric quantity, location information of the terminal, or a proportion of normal charging time.

During the wireless charging process, the terminal may periodically report charging related information, such as a wireless charging speed, an intensity of a wireless charging signal, a charged electric quantity, a current electric quantity, location information of the terminal, and a proportion of normal charging time, etc., to the network device, so that the network device can grasp the current charging condition of the terminal in time. In the case where the charging condition of the terminal is not ideal, the wireless charging configuration may be appropriately modified according to the charging condition of the terminal, so as to make it suitable for wireless charging of the terminal in the current condition.

The location information of the terminal may be Global Positioning System (GPS) information, or may be an area identifier of an area to which the current location of the terminal belongs. The terminal may determine a length of time for which the wireless charging speed and/or the wireless charging power meets a threshold value during wireless charging, and calculate the ratio of the length of time to the overall length of time of wireless charging as a proportion of normal charging time.

FIG. 14 is a schematic flowchart illustrating yet another wireless charging method according to an embodiment of the present disclosure. As shown in FIG. 14, the method includes previously described S901 and further comprises the steps S1401 and S1402.

In step S1401, the leaving indication information sent by the terminal is received.

In step S1402, it is determined that the terminal has left a wireless charging service area according to the leaving indication information.

In an embodiment, the network device may, in the wireless charging configuration, designate one or more wireless charging service areas for the terminal. The network device sends a wireless charging signal to the wireless charging service area, and the terminal may receive the wireless charging signal in the wireless charging service area to perform wireless charging.

However, the location of the terminal changes with the movements of a user. If the terminal leaves the wireless charging service area, it will result in the terminal not being able to receive the wireless charging signal, and thereby not being able to perform wireless charging. Therefore, during the wireless charging process of the terminal, if the terminal leaves the wireless charging service area configured by the wireless charging configuration, the terminal may send leaving indication information to the network device to inform the network device that the terminal has left the wireless charging service area. Thus, the network device may, under the condition that the terminal still needs to be wirelessly charged, modify the wireless charging configuration and reconfigure a wireless charging service area according to the location of the terminal to continue to wirelessly charge the terminal.

In an embodiment, the method further comprises: determining, according to the leaving indication information, whether the terminal expects to continue wireless charging after the terminal leaves the wireless charging service area, and determining location information of the terminal according to the leaving indication information if it is determined that the terminal expects to continue wireless charging.

Since there are various reasons for the terminal to leave the wireless charging service area, it is possible that the terminal leaves the wireless charging service area in order to stop wireless charging, or it is possible that the terminal leaves the wireless charging area with an inadvertent movement of a user while the terminal still expects to continue wireless charging.

Therefore, the terminal may indicate, through the leaving indication information, whether the terminal expects to continue the wireless charging after leaving the wireless charging service area. If the terminal expects to continue the wireless charging, the leaving indication information may further carry the location information of the terminal to be sent to the network device. Thus, the network device may modify the wireless charging configuration, for example, adjusting the beam direction of the wireless charging signal to make it suitable for communicating with the terminal after the terminal leaves the wireless charging service area.

In an embodiment, the method further comprises: receiving expectation indication information sent by the terminal, and determining, according to the expectation indication information, whether the terminal expects to continue wireless charging after the terminal enters an unconnected state.

In an embodiment, the terminal receives the wireless charging signal sent by the network device to perform wireless charging, wherein the wireless charging signal may be received in a connected state or in an unconnected state (including an idle state and an inactive state).

Since in the connected state, there is a communication connection, such as an Radio Resource Control (RRC) connection, between the terminal and the base station, the base station may request the terminal to report real-time location information through the communication connection, so that the base station may modify the beam direction of the wireless charging signal in the wireless charging configuration according to the real-time location information of the terminal to ensure efficient wireless charging of the terminal.

However, in the unconnected state, there is no communication connection between the terminal and the base station, so it is difficult for the base station to acquire the location information of the terminal in real time. In this case, the base station may designate a wireless charging service area for the terminal in the wireless charging configuration information, and send a wireless charging signal to the wireless charging service area. When the terminal moves to the wireless charging service area, it can receive the wireless charging signal for wireless charging. In this way, the wireless charging of the terminal may be implemented under the condition that the base station does not know the real-time location of the terminal.

Therefore, when the terminal enters the unconnected state from the connected state, the terminal may send the expectation indication information to the network device to indicate whether the terminal still expects to continue the wireless charging after entering the unconnected state. Thus, the network device may modify the wireless charging configuration information for the terminal in the unconnected state, so as to make it suitable for wireless charging of the terminal in the unconnected state.

In an embodiment, if it is determined that the terminal expects to continue wireless charging after the terminal enters the unconnected state, the method further comprises: sending unconnected-state wireless charging configuration information to the terminal, wherein an unconnected-state wireless charging service area is carried in the unconnected-state wireless charging configuration information.

In an embodiment, if the terminal expects to continue the wireless charging after entering the unconnected state, the network device may send the unconnected-state wireless charging configuration information to the terminal. Where the unconnected-state wireless charging configuration information may carry an unconnected-state wireless charging service area, so that the terminal receives the wireless charging signal to perform wireless charging when the terminal is located in the connection-state wireless charging service area after the terminal enters the unconnected state.

If there is already a wireless charging service area in the wireless charging configuration information that has been sent to the terminal, it can be selected to carry a new wireless charging service area as an unconnected-state wireless charging service area, in the unconnected-state wireless charging configuration information. Also, it can be selected not to carry an unconnected-state wireless charging service area, and the terminal may default the wireless charging service area already exist in the received wireless charging configuration information, as the unconnected-state wireless charging service area. If there is no wireless charging service area configured in the wireless charging configuration information that has been sent to the terminal, it may be needed to carry a new wireless charging service area as the unconnected-state wireless charging service area, in the unconnected-state wireless charging configuration information.

Certainly, in the connected state, the base station may further designate a wireless charging service area for the terminal in the wireless charging configuration information. In this case, the terminal may not modify the beam direction of the wireless charging signal with the movement of the terminal, and only needs to send the wireless charging signal to the wireless charging service area.

FIG. 15 is a schematic flowchart illustrating yet another wireless charging method according to an embodiment of the present disclosure. As shown in FIG. 15, the method includes previously described S901 and further comprises the steps S1501 and S1502.

In step S1501, an uplink signal sent by the terminal is received.

In step S1502, a location of the terminal is determined according to the uplink signal.

In an embodiment, if the location of the terminal has changed during the wireless charging process, the terminal may send an uplink signal to the network device, and the network device may locate the terminal according to the received uplink signal to determine the location of the terminal, so that the network device may modify the wireless charging configuration according to the location of the terminal, for example, adjusting the beam direction of a wireless charging signal, so as to wirelessly charge the terminal well.

The uplink signal may be, for example, a preamble, a measurement report, an SRS, or the like.

In an embodiment, the method further comprises: receiving wireless charging capability information sent by the terminal; and sending capability support information to the terminal according to the wireless charging capability information, wherein the capability support information indicates that the network device supports wireless charging capability of the terminal.

In an embodiment, the terminal may send its own wireless charging capability information to the network device, for example, a wireless charging power, a wireless charging frequency, and a maximum electric quantity supported by the terminal, and the network device may determine the support for the wireless charging capability of the terminal. If the network device is capable of supporting the wireless charging capability of the terminal, for example, the network device can send a wireless charging signal at the wireless charging frequency supported by the terminal, and can send the wireless charging signal according to the wireless charging power supported by the terminal, the network device may send the capability support information to the terminal. After receiving the capability support information, the terminal may determine that the network device can support wireless charging of the terminal according to the wireless charging capability of the terminal, and then send a wireless charging request to the network device.

FIG. 16 is a schematic flowchart illustrating yet another wireless charging method according to an embodiment of the present disclosure. As shown in FIG. 16, the method includes previously described S901 and further comprises step S1601.

In step S1601, during the wireless charging process of the terminal, if the terminal performs a handover from a source base station to a target base station, the wireless charging is stopped, and the wireless charging configuration for wirelessly charging the terminal by the source base station is sent to the target base station.

In an embodiment, during a wireless charging process of the terminal, a cell handover may also occur. For example, the base station corresponding to the original cell is the source base station, and the base station corresponding to the target cell to which the terminal performs a handover is the target base station. In this case, the source base station may stop wireless charging and send the wireless charging configuration for wirelessly charging the terminal by the source base station to the target base station, so that the target base station may continue to wirelessly charge the terminal according to the received wireless charging configuration.

Further, the terminal may also inform the target base station of the identifier of the source base station. The target base station may send an indication to the source base station after establishing a communication connection with the terminal, so as to instruct the source base station to stop wirelessly charging the terminal and release the wireless charging configuration for the terminal.

Corresponding to the foregoing embodiments of the wireless charging method, the present disclosure further provides embodiments of a wireless charging apparatus.

An embodiment of the present disclosure illustrates a wireless charging apparatus. The wireless charging apparatus shown in the embodiment may be applicable to a terminal, and the terminal includes but is not limited to a mobile phone, a tablet computer, a wearable device, a sensor, an Internet of Things device, and other communication devices. The terminal may serve as a user equipment to communicate with a network device, and the network device includes but is not limited to a network device in a communication system such as 4G, 5G, and 6G, for example, a base station, a core network, and the like.

In an embodiment, the apparatus comprises one or more processors configured to: send to a network device a wireless charging request for requesting the network device to provide a wireless charging configuration for the terminal; wherein the wireless charging request carries first auxiliary information, and the first auxiliary information at least indicates a wireless charging configuration expected by the terminal for assisting the network device to determine the wireless charging configuration.

In an embodiment, the first auxiliary information comprises at least one of: a remaining electric quantity of the terminal, an expected charging speed, speed information of the terminal, location information of the terminal or quality information of a downlink signal received by the terminal.

In an embodiment, the processor is further configured to receive the wireless charging configuration, wherein the wireless charging configuration comprises at least one of: time domain resources of wireless charging, frequency domain resources of wireless charging, an identifier of a wireless charging signal, an identifier of a wireless charging beam, a wireless charging speed, or information of a wireless charging service area.

In an embodiment, the processor is configured to receive broadcast information sent by the network device, and send the wireless charging request to the network device in response to determining, according to the broadcast information that the network device supports wireless charging.

In an embodiment, the processor is configured to send the wireless charging request to the network device in response to at least one of the following conditions is satisfied: a distance from a base station is less than a first distance threshold, a Timing Advance (TA) is less than a preset value, or a signal quality of a downlink signal is higher than a first quality threshold.

In an embodiment, the processor is further configured to receive a wireless charging signal according to the wireless charging configuration, and in response to determining, according to an identifier carried by the wireless charging signal, that the wireless charging signal is used for charging the terminal, perform wireless charging via the wireless charging signal.

In an embodiment, the processor is further configured to stop wireless charging in response to receiving a wireless charging stop indication sent by the network device.

In an embodiment, the processor is further configured to send to the network device a stop request, for requesting the network device to stop wireless charging of the terminal. The stopping of the wireless charging is done according to feedback information sent by the network device for the stop request.

In an embodiment, the processor is further configured to, in response to wireless charging being unable to be performed according to the wireless charging configuration, send notification information to the network device to notify that the terminal is unable to perform wireless charging according to the wireless charging configuration.

In an embodiment, the notification information further carries a reason why the terminal is unable to perform wireless charging according to the wireless charging configuration.

In an embodiment, the processor is further configured to, during a wireless charging process, send to the network device a configuration modification request for requesting the network device to modify the wireless charging configuration.

In an embodiment, the configuration modification request carries second auxiliary information for assisting a network device to modify the wireless charging configuration, wherein the second auxiliary information at least indicates a modified wireless charging configuration expected by the terminal.

In an embodiment, the processor is further configured to periodically send at least one of the following charging related information to the network device during a wireless charging process: a wireless charging speed, an intensity of a wireless charging signal, a charged electric quantity, a current electric quantity, location information of the terminal, or a proportion of normal charging time.

In an embodiment, the processor is further configured to, in response to the terminal leaving a wireless charging service area configured by the wireless charging configuration during wireless charging process, send leaving indication information to the network device to indicate that the terminal has left the wireless charging service area.

In an embodiment, the processor is further configured that: the leaving indication further indicates whether the terminal expects to continue wireless charging after the terminal leaves the wireless charging service area, and carries location information of the terminal in response to the terminal expects to continue the wireless charging.

In an embodiment, the terminal is in a connected state or an unconnected state, and the processor is further configured to send expectation indication information to the network device to indicate whether the terminal expects to continue wireless charging after entering the unconnected state.

In an embodiment, the terminal expects to continue wireless charging after entering the unconnected state, and the processor is further configured to receive unconnected-state wireless charging configuration information sent by the network device, and determine an unconnected-state wireless charging service area according to the unconnected-state wireless charging configuration information; after entering an unconnected state, receive a wireless charging signal to perform wireless charging while the terminal being in the unconnected-state wireless charging service area.

In an embodiment, the processor is further configured to, in response to a location of the terminal having changed during a wireless charging process, send an uplink signal to the network device.

In an embodiment, the processor is configured to, in response to the location of the terminal has changed, send the uplink signal to the network device, in case that a trigger condition is satisfied, wherein the trigger condition includes at least one of: a moving distance with respect to the starting location where a wireless charging signal is received is greater than a second distance threshold; or a signal quality of the wireless charging signal is lower than a second quality threshold.

In an embodiment, the processor is further configured to send wireless charging capability information of the terminal to the network device; receive capability support information sent by the network device according to the wireless charging capability information, wherein the capability support information indicates that the network device supports wireless charging capability of the terminal; wherein, the wireless charging request is sent to the network device after receiving the capability support information.

In an embodiment, the processor is further configured to, during a wireless charging process, in response to the terminal performs a handover from a source base station to a target base station, stop wireless charging, and establish a communication connection with the target base station; send the wireless charging configuration for wirelessly charging the terminal by the source base station to the target base station.

An embodiment of the present disclosure illustrates a wireless charging apparatus. The wireless charging apparatus shown in the embodiment may be applicable to a network device, where the network device includes but is not limited to a network device in a communication system such as 4G, 5G, and 6G, such as a base station and a core network. The terminal includes but is not limited to a communication device such as a mobile phone, a tablet computer, a wearable device, a sensor, and an Internet of Things device. The terminal may be used as user equipment for communicating with the network device.

In an embodiment, the apparatus comprises one or more processors, the processors are configured to receive a wireless charging request sent by a terminal, wherein the wireless charging request is used for requesting to provide a wireless charging configuration for the terminal, and the wireless charging request carries first auxiliary information which at least indicates a wireless charging configuration expected by the terminal for assisting the network device to determine the wireless charging configuration.

In an embodiment, the first auxiliary information comprises at least one of: a remaining electric quantity of the terminal, an expected charging speed, speed information of the terminal, location information of the terminal or quality information of a downlink signal received by the terminal.

In an embodiment, the processor is further configured to send the wireless charging configuration to the terminal, wherein the wireless charging configuration comprises at least one of: time domain resources of wireless charging, frequency domain resources of wireless charging, an identifier of a wireless charging signal, an identifier of a wireless charging beam, a wireless charging speed, or information of a wireless charging service area.

In an embodiment, the processor is further configured to send broadcast information, wherein the broadcast information indicates whether the network device supports wireless charging.

In an embodiment, the processor is further configured to send a wireless charging signal to the terminal according to the wireless charging configuration, wherein a width of a beam corresponding to the wireless charging signal is less than a width of a beam used when the network device communicates with the terminal, and/or a power of the beam corresponding to the wireless charging signal is greater than a power of the beam used when the network device communicates with the terminal.

In an embodiment, the processor is further configured to send a wireless charging signal to the terminal according to the wireless charging configuration, wherein the wireless charging signal carries an identifier of the wireless charging signal and/or an identifier of the terminal used for the terminal to determine whether to perform wireless charging via the wireless charging signal.

In an embodiment, the processor is further configured to send a wireless charging stop indication to the terminal to instruct the terminal to stop wireless charging.

In an embodiment, the processor is further configured to receive a stop request sent by the terminal; send, according to the stop request, feedback information to the terminal to instruct the terminal to stop wireless charging.

In an embodiment, the processor is further configured to receive notification information sent by the terminal, and determine, according to the notification information, that the terminal is unable to perform wireless charging according to the wireless charging configuration.

In an embodiment, the processor is further configured to perform: according to the notification information, determine a reason why the terminal is unable to perform wireless charging according to the wireless charging configuration.

In an embodiment, the processor is further configured to receive a configuration modification request sent by the terminal; modify the wireless charging configuration according to the configuration modification request.

In an embodiment, the processor is further configured to, according to second auxiliary information carried in the configuration modification request, modify the wireless charging configuration, wherein the second auxiliary information at least indicates a modified wireless charging configuration expected by the terminal.

In an embodiment, the processor is further configured to periodically receive at least one of the following charging related information sent by the terminal: a wireless charging speed, an intensity of the wireless charging signal, a charged electric quantity, a current electric quantity, location information of the terminal, or a proportion of normal charging time.

In an embodiment, the processor is further configured to receive leaving indication information sent by the terminal; determine that the terminal has left a wireless charging service area according to the leaving indication information.

In an embodiment, the processor is further configured to determine, according to the leaving indication information, whether the terminal expects to continue wireless charging after the terminal leaves the wireless charging service area, and determine location information of the terminal according to the leaving indication information in response to determining that the terminal expects to continue wireless charging.

In an embodiment, the processor is further configured to receive expectation indication information sent by the terminal, and determine, according to the expectation indication information, whether the terminal expects to continue wireless charging after the terminal enters an unconnected state.

In an embodiment, in response to determining that the terminal expects to continue wireless charging after the terminal enters the unconnected state, the processor is further configured to send unconnected-state wireless charging configuration information to the terminal, wherein an unconnected-state wireless charging service area is carried in the unconnected-state wireless charging configuration information.

In an embodiment, the processor is further configured to receive an uplink signal sent by the terminal; determine a location of the terminal according to the uplink signal.

In an embodiment, the processor is further configured to receive wireless charging capability information sent by the terminal; send capability support information to the terminal according to the wireless charging capability information, wherein the capability support information indicates that the network device supports the wireless charging capability of the terminal.

In an embodiment, the processor is further configured to, during a wireless charging process of the terminal, in response to the terminal performs a handover from a source base station to a target base station, stop wireless charging, and send the wireless charging configuration for wirelessly charging the terminal by the source base station to the target base station.

With regard to the apparatus in the included embodiments, the specific manner in which each module performs operations has been described in detail in the embodiments of the related method, and will not be described in detail here.

For the apparatus embodiment, since it basically corresponds to the method embodiment, it is enough to refer to the relevant part of the description of the method embodiment. The embodiments of the devices described herein are merely schematic wherein the modules illustrated as separate components may or may not be physically separate. The components shown as modules may or may not be physical modules, i.e., they may be located in one place, or may be distributed over a plurality of network modules. Some or all of the modules may be selected according to actual needs to fulfill the purpose of this embodiment scheme. It can be understood and implemented by those of ordinary skill in the art without creative labor.

An embodiment of the present disclosure further provides a communication device, which comprises a processor and a storage for storing a computer program, wherein, when the computer program is executed by the processor, it implements the wireless charging method applicable to the terminal according to any one of the included embodiments.

An embodiment of the present disclosure further provides a communication device, comprising: a processor; and a memory for storing a computer program, wherein, when the computer program is executed by the processor, it implements the wireless charging method applicable to the network device according to any one of the included embodiments.

An embodiment of the present disclosure further proposes a computer readable storage medium for storing a computer program, and when the computer program is executed by the processor, it implements the steps of a wireless charging method applicable to a terminal according to any one of the included embodiments.

An embodiment of the present disclosure further proposes a computer readable storage medium for storing a computer program, and when the computer program, when executed by a processor, implements the steps of the wireless charging method applicable to the network device according to any one of the included embodiments.

As shown in FIG. 17, FIG. 17 is a schematic block diagram illustrating an apparatus 1700 for wireless charging according to an embodiment of the present disclosure. The apparatus 1700 may be provided as a base station or a core network. Referring to FIG. 17, the apparatus 1700 includes a processing component 1722, a wireless sending/receiving component 1724, an antenna component 1726, and a wireless-interface-specific signal processing portion. The processing component 1722 may further comprise one or more processors (not shown). One of the processors in the processing component 1722 may be configured to implement a wireless charging method for a network device as described according to any one of the embodiments herein. A "component" can be any known apparatus capable of performing the described function.

FIG. 18 is a schematic block diagram illustrating an apparatus 1800 for wireless charging according to an embodiment of the present disclosure. For example, the apparatus 1800 may be a mobile phone, a computer, a digital broadcast terminal, a message transceiver, a game console, a tablet device, a medical device, a fitness device, a personal digital assistant, etc.

Referring to FIG. 18, the device 1800 may include one or more of the following: a processing component 1802, a storage 1804, a power supply component 1806, a multimedia component 1808, an audio component 1810, an input/output (I/O) interface 1812, a sensor component 1814, and a communication component 1816.

The processing component 1802 generally controls the overall operations of the device 1800, such as operations associated with displaying, phone calls, data communications, camera operations, and recording operations. The processing component 1802 may comprise one or more processors 1820 to execute instructions to complete some or all of the steps of the information sending method described herein. In addition, the processing component 1802 may comprise one or more modules to facilitate interactions between the processing component 1802 and other components. For example, processing component 1802 may comprise a multimedia module to facilitate interactions between the multimedia component 1808 and the processing component 1802.

The storage 1804 is configured to store various types of data to support operations on the device 1800. Examples of such data comprise instructions for any application or method operating on the device 1800, contact data, phonebook data, messages, pictures, videos, etc. The storage 1804 may be implemented by any type of volatile or non-volatile storage device or a combination thereof, such as static random access memory (SRAM), electrically erasable programmable read-only memory (EEPROM), erasable programmable read-only memory (EPROM), programmable read-only memories (PROM), read-only memories (ROM), magnetic memory, flash memory, disks or optical disks.

The power supply component 1806 provides power to the various components of the device 1800. Power supply component 1806 may comprise a power management system, one or more power supplies, and other components associated with generating, managing, and distributing power for device 1800.

The multimedia component 1808 comprises a screen providing an output interface between the device 1800 and a user. In some embodiments, the screen may comprise a liquid crystal display (LCD) and a touch panel (TP). If the screen comprises a touch panel, the screen may be implemented as a touch screen to receive input signals from a user. The touch panel comprises one or more touch sensors to sense touches, swipes, and gestures on the touch panel. The touch sensor may not only sense the boundary of a touch or a swipe action, but also detect the duration and the pressure associated with the touch or the sliding action. In some embodiments, the multimedia component 1808 comprises a front facing camera and/or a rear facing camera. When the device 800 is in operating mode, such as shooting mode or video mode, the front facing camera and/or the rear facing camera may receive external multimedia data. Each front facing camera and rear facing camera can be a fixed optical lens system or have focal length and optical zoom capabilities The audio component 1810 is configured to output and/or input audio signals. For example, the audio component 1810 comprises a microphone (MIC), and when the device 1800 is in operating mode, such as calling mode, recording mode, and speech recognition mode, the microphone is configured to receive external audio signals. The received audio signals may be further stored in the memory 1804 or transmitted via communication component 1816. In some embodiments, the audio component 1810 further comprises a speaker for outputting audio signals.

The I/O interface 1812 provides an interface between the processing component 1802 and peripheral interface modules, and the peripheral interface modules may be a keyboard, a click wheel, buttons, etc. These buttons may comprise, but are not limited to: a home button, a volume button, a launch button, and a lock button.

The sensor component 1814 comprises one or more sensors for providing a state assessment of various aspects of the device 1800. For example, sensor component 1814 may detect the on/off status of device 1800, relative positioning of the components, and the components are, for example, a display and a keypad of device 1800, and the sensor component 1814 may further detect the change in the position of device 1800 or a component of the device 1800, the presence or absence of user contact with device 1800, the orientation or acceleration/deceleration of the device 1800 and the temperature change of the device 1800. The sensor component 1814 may comprise a proximity sensor configured to detect the presence of a nearby object in the absence of any physical contact. The sensor component 1814 may also comprise an optical sensor, such as a CMOS or CCD image sensor, for use in imaging applications. In some embodiments, the sensor component 1814 may further comprise an acceleration sensor, a gyro sensor, a magnetic sensor, a pressure sensor, or a temperature sensor.

The communication component 1816 is configured to facilitate wired or wireless communication between the device 1800 and other devices. The device 1800 may access a wireless network based on a communication standard, such as WiFi, 2G or 3G, 4G LTE, 5G NR, or a combination thereof. In an exemplary embodiment, the communication component 1816 receives broadcast signals or broadcast associated information from an external broadcast management system via a broadcast channel. In an exemplary embodiment, the communication component 1816 also comprises a near field communication (NFC) module to facilitate short-range communications. For example, the NFC module may be implemented based on Radio Frequency Identification (RFID) technology, Infrared Data Association (IrDA) technology, Ultra Wideband (UWB) technology, Bluetooth (BT) technology and other technologies.

In an example embodiment, the device 1800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing any of the described wireless charging methods applicable to a terminal.

In an exemplary embodiment, a non-transitory computer-readable storage medium comprising instructions is also provided, such as memory 1804 comprising instructions, and the instructions can executed by processor 1820 of device 1800 to perform any of the described wireless charging methods applicable to a terminal. For example, the non-transitory computer readable storage medium may be a ROM, random access memory (RAM), CD-ROM, magnetic tape, floppy disk, optical data storage device, and the like. A "component" or "module" can be any known apparatus capable of performing the described function.

Other embodiments of the disclosure will occur to those skilled in the art upon consideration of the specification and practice of the disclosure disclosed herein. The disclosure is intended to cover any variations, uses, or adaptations of the disclosure that follow from the general principles of the disclosure and include common general knowledge or customary practice in the art not disclosed in this disclosure. It is intended that the specification and examples be considered as exemplary only, with a true scope and spirit of the disclosure being indicated by the following claims.

It is to be understood that the present disclosure is not limited to the precise constructions which have been described herein and shown in the accompanying drawings, and that various modifications and changes may be made without departing from the scope thereof. The scope of the present disclosure is limited only by the appended claims.

Relation terms, such as first and second and the like, may be used herein only to distinguish one entity or operation from another entity or operation without necessarily requiring or implying any such actual relationship or order between such entities or operations. The terms "comprises," "comprising," or any other variation thereof, are intended to cover a non-exclusive inclusion, such that a process, a method, an object, or a device that comprises a list of elements does not comprise only those elements but may comprise other elements not expressly listed or inherent to such process, method, object, or device. Without further limitation, the fact that an element is defined by the phrase "comprising a . . . " does not exclude the presence of another identical element in the process, method, object or device comprising the element.

The detailed description of the methods and devices provided by the embodiments of the present disclosure is provided herein, and specific examples are applied herein to illustrate the principles and implementations of the present disclosure, and the illustrations of the embodiments are only used to assist in the understanding of the methods of the present disclosure and the core ideas thereof; at the same time, for those of ordinary skill in the field, based on the ideas of the present disclosure, there will be changes in the specific implementations and the scope of application, and in summary, the contents of the specification should not be understood as a limitation of the present disclosure.

The invention claimed is:

1. A wireless charging method, performed by a terminal, wherein the method comprises:

sending, to a network device, a wireless charging request for requesting the network device to provide a wireless charging configuration for the terminal, in response to determining that a timing advance is less than a preset value;

wherein the wireless charging request carries first auxiliary information, and the first auxiliary information at least indicates a wireless charging configuration expected by the terminal for assisting the network device to determine the wireless charging configuration;

in response to the terminal leaving a wireless charging service area configured by the wireless charging configuration during a wireless charging process, sending leaving indication information to the network device to indicate that the terminal has left the wireless charging service area, wherein the leaving indication information further indicates whether the terminal expects to continue wireless charging after leaving the wireless charging service area, and carries location information of the terminal in response to the terminal expects to continue the wireless charging;

in response to that the terminal is in a connected state or an unconnected state, sending expectation indication information to the network device to indicate whether the terminal expects to continue wireless charging after entering the unconnected state;

wherein the terminal expects to continue wireless charging after entering the unconnected state, and the method further comprises:

receiving unconnected-state wireless charging configuration information sent by the network device, determining an unconnected-state wireless charging service area according to the unconnected-state wireless charging configuration information, and after entering the unconnected state, receiving a wireless charging signal to perform wireless charging while being in the unconnected-state wireless charging service area.

2. The method according to claim 1, wherein at least one of the following:

the first auxiliary information comprises at least one of:
a remaining electric quantity of the terminal,
an expected charging speed,
speed information of the terminal,
location information of the terminal, or
quality information of a downlink signal received by the terminal; or the method further comprises:
receiving the wireless charging configuration comprising at least one of:
time domain resources of wireless charging,
frequency domain resources of wireless charging,
an identifier of a wireless charging signal,
an identifier of a wireless charging beam,
a wireless charging speed, or
information of a wireless charging service area.

3. The method according to claim 1, wherein at least one of the following:

the sending the wireless charging request to the network device comprises:

receiving broadcast information sent by the network device, and sending the wireless charging request to the network device in response to determining, according to the broadcast information, that the network device supports wireless charging; or wherein the sending the wireless charging request to the network device comprises:

sending wireless charging capability information of the terminal to the network device, receiving capability support information sent by the network device according to the wireless charging capability information, wherein the capability support information indicates that the network device supports wireless charging capability of the terminal, and sending the wireless charging request to the network device after receiving the capability support information.

4. The method according to claim 1, wherein the method further comprises:

receiving a wireless charging signal according to the wireless charging configuration; and at least one of:

in response to determining, according to an identifier carried by the wireless charging signal, that the wireless charging signal is used for charging the terminal, performing wireless charging via the wireless charging signal, or stopping wireless charging in response to receiving a wireless charging stop indication sent by the network device, or sending, to the network device, a stop request for requesting the network device to stop wireless charging of the terminal, and stopping wireless charging according to feedback information sent by the network device for the stop request, or in response to wireless charging is unable to be performed according to the wireless charging configuration, sending notification information to the network device to notify that the terminal is unable to perform wireless charging according to the wireless charging configuration, wherein the notification information further carries a reason why the terminal is unable to perform wireless charging according to the wireless charging configuration.

5. The method according to claim 1, wherein the method further comprises at least one of:

during a wireless charging process, sending to the network device a configuration modification request for requesting the network device to modify the wireless charging configuration, wherein the configuration modification request carries second auxiliary information, and the second auxiliary information at least indicates a modified wireless charging configuration expected by the terminal for assisting the network device to modify the wireless charging configuration;

ordering a wireless charging process, periodically sending at least one of following charging related information to the network device: a wireless charging speed, an intensity of a wireless charging signal, a charged electric quantity, a current electric quantity, location information of the terminal, or a proportion of normal charging time.

6. The method according to claim 1, wherein the method further comprises:

in response to a location of the terminal has changed during a wireless charging process, sending an uplink signal to the network device, comprising: in response to the location of the terminal has changed, sending the uplink signal to the network device in case that a trigger condition is satisfied, wherein the trigger condition comprises at least one of:

a moving distance with respect to a starting location where a wireless charging signal is received is greater than a second distance threshold, or a signal quality of the wireless charging signal is lower than a second quality threshold.

7. The method according to claim 1 wherein the method further comprises:

during a wireless charging process, in response to that the terminal performs a handover from a source base station to a target base station, stopping wireless charging, and establishing a communication connection with the target base station;

sending the wireless charging configuration for wirelessly charging the terminal by the source base station to the target base station.

8. A wireless charging method, performed by a network device, wherein the method comprises:

receiving a wireless charging request sent by a terminal, wherein the wireless charging request is used for requesting to provide a wireless charging configuration for the terminal, and the wireless charging request carries first auxiliary information which at least indicates a wireless charging configuration expected by the terminal for assisting the network device to determine the wireless charging configuration; and the wireless charging request is sent by the terminal in response to that a timing advance is less than a preset value;

receiving leaving indication information sent by the terminal, and determining that the terminal has left a wireless charging service area according to the leaving indication information;

determining, according to the leaving indication information, whether the terminal expects to continue wireless charging after the terminal leaves the wireless charging service area, and determining location information of the terminal according to the leaving indication information in response to determining that the terminal expects to continue wireless charging;

in response to that the terminal is in a connected state or an unconnected state, receiving expectation indication information sent by the terminal, and determining, according to the expectation indication information, whether the terminal expects to continue wireless charging after the terminal enters the unconnected state;

wherein in response to determining that the terminal expects to continue wireless charging after the terminal enters the unconnected state, the method further comprises:

sending unconnected-state wireless charging configuration information to the terminal, wherein an unconnected-state wireless charging service area is carried in the unconnected-state wireless charging configuration information.

9. The method according to claim 8, wherein at least one of the following:

the first auxiliary information comprises at least one of: a remaining electric quantity of the terminal, an expected charging speed, speed information of the terminal, location information of the terminal, or quality information of a downlink signal received by the terminal; or the method further comprises:

sending the wireless charging configuration to the terminal, wherein the wireless charging configuration comprises at least one of:

time domain resources of wireless charging, frequency domain resources of wireless charging, an identifier of a wireless charging signal, an identifier of a wireless charging beam, a wireless charging speed, or information of a wireless charging service area.

10. The method according to claim 8, wherein the method further comprises at least one of:

sending broadcast information, wherein the broadcast information indicates whether the network device supports wireless charging; or sending a wireless charging signal to the terminal according to the wireless charging configuration, wherein a width of a beam corresponding to the wireless charging signal is less than a width of a beam used when the network device communicates with the terminal, and/or a power of the beam corresponding to the wireless charging signal is greater than a power of the beam used when the network device communicates with the terminal; or sending the wireless charging signal to the terminal according to the wireless charging configuration, wherein the wireless charging signal carries an identifier of the wireless charging signal and/or an identifier of the terminal used for the terminal to determine whether to perform wireless charging via the wireless charging signal.

11. The method according to claim 8, wherein the method further comprises:

sending a wireless charging stop indication to the terminal to instruct the terminal to stop wireless charging; or receiving a stop request sent by the terminal, and sending, according to the stop request, feedback information to the terminal to instruct the terminal to stop wireless charging.

12. The method according to claim 8, wherein the method further comprises at least one of:

receiving notification information sent by the terminal, and according to the notification information, determining that the terminal is unable to perform wireless charging according to the wireless charging configuration, wherein the notification information further carries a reason why the terminal is unable to perform wireless charging according to the wireless charging configuration; or receiving a configuration modification request sent by the terminal, and modifying the wireless charging configuration according to the configuration modification request, wherein the configuration modification request carries second auxiliary information, the second auxiliary information at least indicates a modified wireless charging configuration expected by the terminal.

13. The method according to claim 8, wherein the method further comprises at least one of:

periodically receiving at least one of following charging related information sent by the terminal:

a wireless charging speed, an intensity of a wireless charging signal, a charged electric quantity, a current electric quantity, location information of the terminal, or a proportion of normal charging time.

14. The method according to claim 8, wherein the method further comprises at least one of:

receiving an uplink signal sent by the terminal, and determining a location of the terminal according to the uplink signal; or receiving wireless charging capability information sent by the terminal, and sending capability support information to the terminal according to the wireless charging capability information, wherein the capability support information indicates that the network device supports wireless charging capability of the terminal; or during a wireless charging process of the terminal, in response to the terminal performs a handover from a source base station to a target base station, stopping wireless charging, and sending the wireless charging configuration for wirelessly charging the terminal by the source base station to the target base station.

15. A wireless charging apparatus, wherein the apparatus comprises one or more processors configured to:

send to a network device a wireless charging request for requesting the network device to provide a wireless charging configuration for a terminal, in response to determining that a timing advance is less than a preset value;

wherein the wireless charging request carries first auxiliary information, and the first auxiliary information at least indicates a wireless charging configuration expected by the terminal for assisting the network device to determine the wireless charging configuration;

in response to the terminal leaving a wireless charging service area configured by the wireless charging configuration during a wireless charging process, send leaving indication information to the network device to indicate that the terminal has left the wireless charging service area, wherein the leaving indication information further indicates whether the terminal expects to continue wireless charging after leaving the wireless charging service area, and carries location information of the terminal in response to the terminal expects to continue the wireless charging;

in response to that the terminal is in a connected state or an unconnected state, send expectation indication information to the network device to indicate whether the terminal expects to continue wireless charging after entering the unconnected state;

wherein in response to determining that the terminal expects to continue wireless charging after entering the unconnected state, and the wireless charging apparatus is further configured to:

receive unconnected-state wireless charging configuration information sent by the network device, determine an unconnected-state wireless charging service area according to the unconnected-state wireless charging configuration information, and after the terminal entering the unconnected state, receive a wireless charging signal to perform wireless charging while being in the unconnected-state wireless charging service area.

16. A communication apparatus, comprising:

a processor; and a non-transitory storage for storing a computer program communicatively connected to the processor, and wherein the computer program, when executed by the processor, implements the wireless charging method according to claim 8.

17. A non-transitory computer readable storage medium for storing a computer program, wherein the computer program, when executed by a processor, implements the steps of the wireless charging method according to claim 1.

* * * * *